United States Patent
Chen et al.

(10) Patent No.: US 7,688,859 B2
(45) Date of Patent: Mar. 30, 2010

(54) TELECOMMUNICATIONS APPARATUS AND METHOD

(75) Inventors: Xiaobao Chen, Swindon (GB); Alan George Stidwell, Bodmin (GB); Martin Barkley Harris, Bristol (GB)

(73) Assignee: Orange SA, Paris (FR)

( * ) Notice: Subject to any disclaimer, the term of this patent is extended or adjusted under 35 U.S.C. 154(b) by 993 days.

(21) Appl. No.: 10/550,008

(22) PCT Filed: Mar. 12, 2004

(86) PCT No.: PCT/GB2004/001035

§ 371 (c)(1),
(2), (4) Date: May 11, 2006

(87) PCT Pub. No.: WO2004/084574

PCT Pub. Date: Sep. 30, 2004

(65) Prior Publication Data

US 2006/0274706 A1 Dec. 7, 2006

(30) Foreign Application Priority Data

Mar. 17, 2003 (GB) .................. 0306052.2

(51) Int. Cl.
*H04J 3/24* (2006.01)

(52) U.S. Cl. .............. 370/474; 370/469; 370/470; 370/471; 370/472; 370/473

(58) Field of Classification Search .............. 370/474, 370/469, 351, 352, 353, 401, 419, 476, 389, 370/473, 470, 471, 472, 475, 395.52
See application file for complete search history.

(56) References Cited

U.S. PATENT DOCUMENTS

H2051 H    11/2002   Zhu et al. .............. 370/395.21
6,728,208 B1   4/2004   Puuskari .................. 370/230.1
6,839,356 B2 *   1/2005   Barany et al. ............... 370/401
6,983,163 B2 *   1/2006   Sato et al. .................... 455/519

(Continued)

FOREIGN PATENT DOCUMENTS

EP    1 096 742 A1    5/2001

(Continued)

OTHER PUBLICATIONS

3GPP TS 26. 102 V 3.3.0 (Mar. 2001), $3^{rd}$ Generation Partnership Project; Mandatory speech codec; AMR speech codec, Interface to Iu and Uu Release 1999, 1-13pages.

(Continued)

*Primary Examiner*—Ayaz R Sheikh
*Assistant Examiner*—Chuong T Ho
(74) *Attorney, Agent, or Firm*—Haverstock & Owens LLP

(57) ABSTRACT

A telecommunications system communicates internet packet data, carrying payload data including a plurality of different data types, with a mobile communications user equipment. The system comprises a gateway support node (GGSN), a service support node (SGSN) and a radio network controller (RNC). At least one of the gateway support node (GGSN) and the user equipment (UE) are operable to: parse the payload data in each data packet; generate a radio access bearer sub-flow indicator indicating the number of different types of data in the payload and the number of symbols in each different data type; and form a transport frame including the sub-flow indicator. The data packets are communicated between the radio network controller and the user equipment by detecting the sub-flow indicator, and in accordance with the sub-flow indicator arranging for the data from each of the different data fields to be communicated via a different radio access bearer providing different quality of service parameters appropriate for the different data type.

55 Claims, 17 Drawing Sheets

U.S. PATENT DOCUMENTS

| | | | |
|---|---|---|---|
| 6,990,340 B2 * | 1/2006 | Tamura et al. | 455/432.2 |
| 7,106,718 B2 * | 9/2006 | Oyama et al. | 370/340 |
| 7,181,209 B2 * | 2/2007 | Tamura | 455/432.1 |
| 7,230,937 B2 * | 6/2007 | Chi et al. | 370/329 |
| 2001/0033582 A1 | 10/2001 | Sakkinen et al. | 370/474 |
| 2001/0041575 A1 | 11/2001 | Amirijoo et al. | 455/456 |
| 2002/0077065 A1 | 6/2002 | Tamura et al. | 455/72 |
| 2003/0012133 A1 | 1/2003 | Jappinen | 370/225 |
| 2003/0021256 A1 * | 1/2003 | Lee | 370/342 |
| 2003/0081592 A1 * | 5/2003 | Krishnarajah et al. | 370/352 |
| 2004/0203640 A1 * | 10/2004 | Molander et al. | 455/414.1 |
| 2005/0213546 A1 * | 9/2005 | Reitter et al. | 370/338 |
| 2006/0268818 A1 * | 11/2006 | Chen et al. | 370/349 |
| 2006/0274706 A1 | 12/2006 | Chen et al. | 370/340 |

FOREIGN PATENT DOCUMENTS

| | | |
|---|---|---|
| EP | 1 443 784 A1 | 8/2004 |
| WO | WO 01/63898 A2 | 8/2001 |
| WO | WO 01/76282 A2 | 10/2001 |
| WO | WO 02/30056 A2 | 4/2002 |
| WO | WO 02/098077 A1 | 12/2002 |

OTHER PUBLICATIONS

Universal Mobile Telecommunications System (UMTS); UTRAN Iu Interface User Plan Protocols (3GPP TS 25.415 version 3.5.0 Release 1999), ETSI TS 125 415 V3.5.0 (Dec. 2000), XP-002210774, pp. 56.

Universal Mobile Telecommunications Systems (UMTS); UTRAN Overall Description (3G TS 25.401 version 3.3.0 Release 1999), ETSI TS 125 401 V3.3.0 (Jun. 2000) XP-002181964, pp. 1-36.

* cited by examiner

Table 1

| RAB service attribute | RAB service attribute value | | Comments |
|---|---|---|---|
| Traffic Class | Conversational | | |
| RAB Asymmetry Indicator | Symmetric, bidirectional | | Symmetric RABs are used for uplink and downlink |
| Maximum bit rate | 12,65 kbit/s in configurations 0 and 1<br>15,85 kbit/s in configurations 2 and 3<br>23,85 kbit/s in configurations 4 and 5 | | This value depends on the highest mode rate in the RFCS (note 2) |
| Guaranteed bit rate | 6,60 kbit/s | | One of the values chosen, depending on the lowest rate controllable SDU format (note 2) |
| Delivery Order | Yes | | (note 1) |
| Maximum SDU size | 253 in configurations 0 and 1<br>317 in configurations 2 and 3<br>477 in configurations 4 and 5 | | Maximum size of payload field in Iu UP, according to the highest mode rate in the RFCS (note 2) |
| Traffic Handling Priority | Not applicable | | Parameter not applicable for the conversational traffic class (note 1) |
| Source statistics descriptor | Speech | | (note 1) |
| SDU Parameters | RAB subflow 1 (Class A bits) | RAB subflow 2 (Class B bits) | The number of SDU, their number of RAB subflow is subject to operator tuning (note 3) |

Fig. 9 continued

| SDU error ratio | $7*10^{-3}$ | | (note 3) |
| --- | --- | --- | --- |
| Residual bit error ratio | $10^{-6}$ | $10^{-3}$ | (note 3 - applicable for every subflow) |
| Delivery of erroneous SDUs | Yes | | Class A bits are delivered with error indication; Class B bits are delivered without any error indication |
| SDU format information 1-5 | | | (note 4) |
| sub-flow SDU size 1-5 | (note 5) | (note 5) | |

NOTE 1: These parameters apply to all UMTS speech codec types.
NOTE 2: The guaranteed bit rate depends on the periodicity and the lowest rate controllable SDU size. All UMTS_AMR-WB configurations as defined in TS 26.103 contain the 6,60 kbps codec mode as lowest and therefore "guaranteed bit rate". The "maximum bit rate" and the "maximum SDU size" depend on the selected UMTS_AMR-WB configuration.
NOTE 3: These parameters are subject to operator tuning.
NOTE 4: SDU format information has to be specified for each AMR-WBcore frame type (i.e. with speech bits and comfort noise bits) included in the RFCS as defined in [2].
NOTE 5: The subflow SDU size corresponding to an AMR-WBcore frame type indicates the number of bits in the class A, class B fields as specified in Table 2 (see Fig.10)

Fig. 9 continued

Table 2:

| Frame Type Index | No of Class A Bits per frame | No of Class B Bits per frame | No of Class C Bits per frame | Total No. of Bits per frame |
|---|---|---|---|---|
| 1 | 64 | 113 | 0 | 198 |
| 2 | 72 | 181 | 0 | 274 |
| 3 | 72 | 213 | 0 | 306 |
| 4 | 72 | 245 | 0 | 338 |
| 5 | 72 | 293 | 0 | 386 |

Fig. 10

Table 3

| UMTS_AMR-WB | RAB sub-flows | | Total number of bits per RAB sub-flow combination (Mandatory) | Source rate |
|---|---|---|---|---|
| RFCI | RAB sub-flow 1 (Optional) | RAB sub-flow 2 (Optional) | | |
| Example 1 | | | | |
| 1 | 40 | 0 | 40 | AMR-WB SID |
| 2 | 54 | 78 | 132 | AMR-WB 6.6 kbps |
| 3 | 64 | 113 | 177 | AMR-WB 8.85 kbps |
| 4 | 72 | 181 | 253 | AMR-WB 12.65 kbps |
| Example 2 | | | | |
| 1 | 40 | 0 | 40 | AMR-WB SID |
| 2 | 54 | 78 | 132 | AMR-WB 6.6 kbps |
| 3 | 64 | 113 | 177 | AMR-WB 8.85 kbps |
| 4 | 72 | 181 | 253 | AMR-WB 12.65 kbps |
| 5 | 73 | 244 | 317 | AMR-WB 15.85 kbps |
| Example 3 | | | | |
| 1 | 40 | 0 | 40 | AMR-WB SID |
| 2 | 54 | 78 | 132 | AMR-WB 6.6 kbps |
| 3 | 64 | 113 | 177 | AMR-WB 8.85 kbps |
| 4 | 72 | 181 | 253 | AMR-WB 12.65 kbps |
| 5 | 74 | 403 | 477 | AMR-WB 23.85 kbps |

Fig. 11

| | 8 | 7 | 6 | 5 | 4 | 3 | 2 | 1 | |
|---|---|---|---|---|---|---|---|---|---|
| | Quality of service IEI | | | | | | | | Octet 1 |
| | Length of quality of service IE | | | | | | | | Octet 2 |
| | 0 0 spare | | Delay class | | | Reliability class | | | Octet 3 |
| | Peak throughput | | | | 0 spare | Precedence class | | | Octet 4 |
| | 0 0 0 spare | | | Mean throughput | | | | | Octet 5 |
| | Traffic Class | | | Delivery order | | Delivery of erroneous SDU | | | Octet 6 |
| | Maximum SDU size | | | | | | | | Octet 7 |
| | Maximum bit rate for uplink | | | | | | | | Octet 8 |
| | Maximum bit rate for downlink | | | | | | | | Octet 9 |
| | Residual BER | | | | Transfer delay | | | | Octet 10 |
| | SDU error ratio | | | | Traffic Handling priority | | | | Octet 11 |
| | Guaranteed bit rate for uplink | | | | | | | | Octet 12 |
| | Guaranteed bit rate for downlink | | | | | | | | Octet 13 |

Fig. 12

| | 8 | 7 | 6 | 5 | 4 | 3 | 2 | 1 | |
|---|---|---|---|---|---|---|---|---|---|
| | Quality of service IEI | | | | | | | | Octet 1 |
| | Length of quality of service IE | | | | | | | | Octet 2 |
| | 0 0 spare | | Delay class | | | Reliability class | | | Octet 3 |
| | Precedence class | | | 0 spare | | | | | Octet 4 |
| | Peak throughput | | | | Mean throughput | | | | Octet 5 |
| | Optional QoS Indication Bits | | | Delivery order | | Delivery of erroneous SDU | | | Octet 6 |
| | Traffic Class | | | Maximum SDU size | | | | | Octet 7 |
| | Maximum bit rate for uplink | | | | | | | | Octet 8 |
| | Maximum bit rate for downlink | | | | | | | | Octet 9 |
| | Residual BER | | | | SDU error ratio | | | | Octet 10 |
| | Transfer delay | | | | | Traffic Handling priority | | | Octet 11 |
| | Guaranteed bit rate for uplink | | | | | | | | Octet 12 |
| | Guaranteed bit rate for downlink | | | | | | | | Octet 13 Octet 14 |
| | QoS optional field 1 | | | | | | | | Octet 22 Octet 23 |
| | QoS optional field 2 | | | | | | | | Octet 31 |

Fig. 13

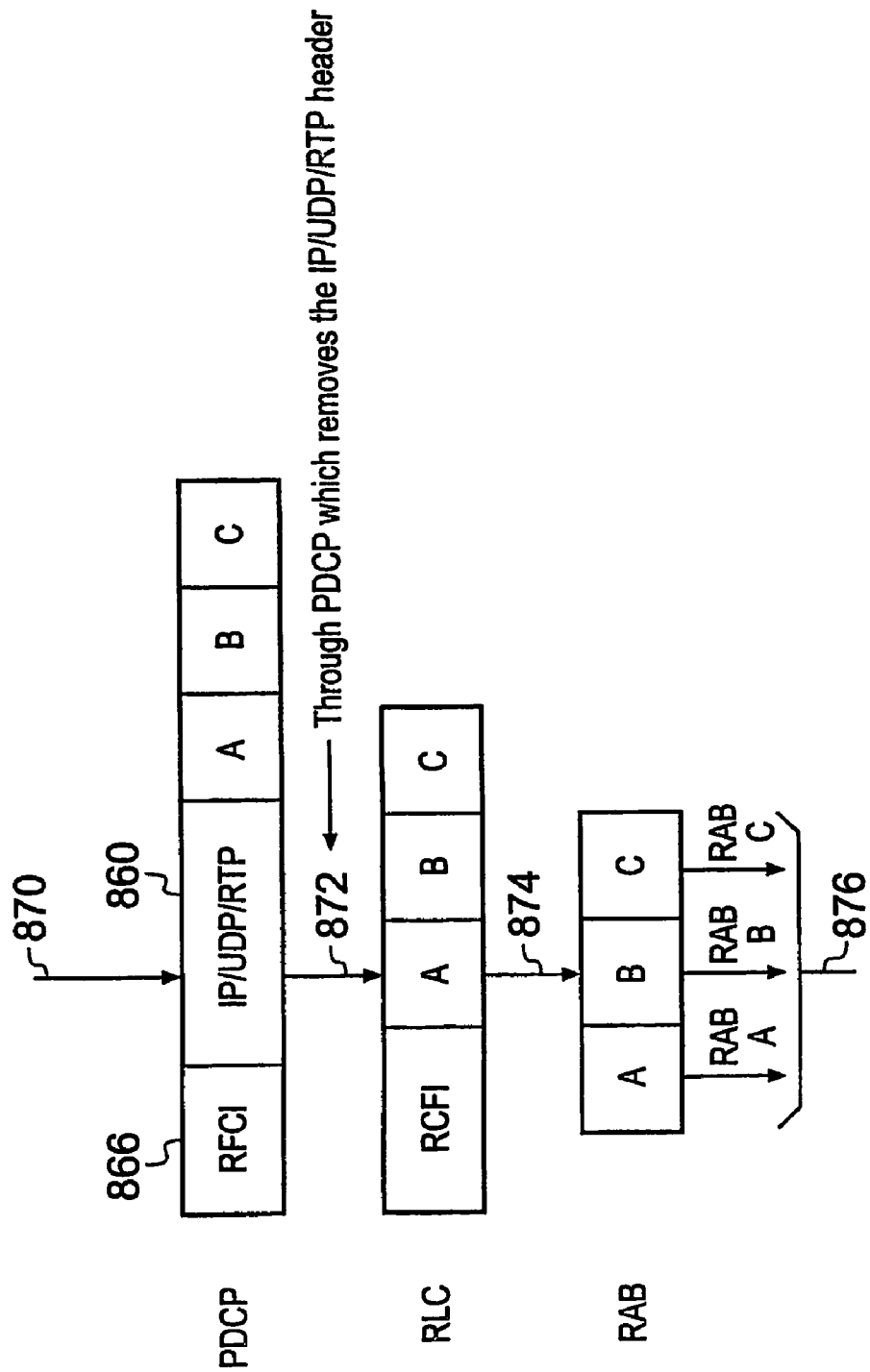

TELECOMMUNICATIONS APPARATUS AND METHOD

FIELD OF THE INVENTION

The present invention relates to telecommunications systems for providing a facility for communicating internet packet data to and/or from a mobile communications user equipment.

BACKGROUND OF THE INVENTION

Mobile radio networks such as the Global System for Mobiles (GSM) and the Universal Mobile Telecommunications System ((UMTS) can provide a facility for communicating data in circuit switched mode or using data packets. In circuit switched mode a physical communications channel is allocated for a logical communications channel throughout a call. For the communication of data packets, the General Packet Radio Service (GPRS) has been developed. GPRS provides support for a packet-orientated service, which attempts to optimise network and radio resources for packet data communications such as for example Internet Packets (IP). The GPRS provides a-logical architecture, which is related to the circuit switched architecture of a mobile radio system.

The system for communicating data between a mobile communications user equipment (UE) and a packet data telecommunications network comprises: a gateway support node (GGSN) that provides an interface between the packet data telecommunications network and the user equipment for communication of data packets over the mobile telecommunications network and a service support node (SGSN) that controls communication of data packets between the gateway support node and the user equipment using a radio network controller (RNC) that controls radio resources of the telecommunications network.

The packet data is communicated either from the UE to the GGSN or from the GGSN to the UE using a single radio access bearer set up by the RNC according to a single given predetermined set of quality of service (QoS) parameters associated with the payload of the data packet. Radio resources provided by the mobile telecommunications network for communicating data packets between the UE and the RNC are a valuable commodity and can be a limiting factor in whether or not a particular radio access bearer can be supported, depending upon for example current loading of the network. As such, it is desirable to use the radio resources as efficiently as possible.

SUMMARY OF INVENTION

According to the present invention there is provided a telecommunications system for providing a facility for communicating internet packet data with a mobile communications user equipment. The internet packet data may be communicated to the user equipment or from the user equipment or to and from the user equipment. The internet packet data carries payload data which includes a plurality of different data types. The telecommunications system comprises a gateway support node operable to provide an interface for communicating the data packets between the user equipment and a packet data telecommunications network, and a service support node. The service support node is operable to communicate the data packets between the gateway support node and the mobile user equipment using a radio network controller, the radio network controller being operable to provide a radio access bearer for communicating the data packets with the user equipment. At least one of the gateway support node and the user equipment are operable to parse the payload data in each data packet to determine a number of the plurality of different data types and a number of data symbols in each of the different data types, to generate a radio access bearer sub-flow indicator providing an indication of the number of different types of data in the payload and the number of symbols in each different data type, to form a transport frame for each data packet by combining the payload data for each data packet with the sub-flow indicator, the transport frame being used to communicate each data packet between the gateway support node and the radio network controller via the service support node, and the data packets are communicated between the radio network controller and the user equipment by detecting the sub-flow indicator, and in accordance with the sub-flow indicator arranging for the data from each of the different data fields to be communicated via a different radio access bearer providing different quality of service parameters appropriate for the different data type.

The payload of an internet data packet may comprise different data types having different characteristics and/or different levels of importance. The use of a single set of QoS parameters for communication of the payload means that for example the same bit error rate is guaranteed for all data of the payload regardless of its data type. Transmission of data at low bit error rates requires a larger bandwidth and thus may be wasteful of radio resources for example for data of relatively low importance. The single set of QoS parameters associated with the data packet must take account of the most important data of the payload to ensure that this data reaches its destination reliably. The telecommunications system has no way of determining the data type of the data bits in the payload of a data packet when allocating radio resources for transmission of that payload. Accordingly, known systems for transporting data packets bi-directionally to and/or from the GGSN and the UE may not make efficient use of radio resources, particularly where the payload of the data packet comprises different types of data which have different types of characteristics and/or may be of unequal importance.

Embodiments of the present invention can provide an arrangement for efficiently transporting internet protocol data packets carrying different types of data to and/or from (between) the gateway support node and the user equipment without requiring substantial changes to the form of a radio network controller according to an existing architecture, one example of which is a mobile radio network operating in accordance with the general packet radio system.

In some embodiments, a computer readable medium stores a computer program having computer executable instructions, which when loaded on to a data processor causes the data processor to perform a method for communicating internet packet data with a mobile communications user equipment, the internet packet data carrying payload data including a plurality of different data types, comprising providing an interface for communicating the data packets between the mobile communications user equipment and a packet data telecommunications network, communicating the data packets between the interface and the mobile communications user equipment using a radio network controller, the radio network controller being operable to provide radio access bearers for communicating the data packets to and/or from the mobile communications user equipment, wherein the communicating the data packets between the interface and the mobile communications user equipment comprises parsing the payload data in each data packet to determine a number of the plurality of different types of data and a number of data symbols in each of the different data types, generating a radio access bearer sub-flow indicator providing an indication of the number of different types of data in the payload and the number of symbols in each different data type, forming a transport frame for each data packet by combining the payload data for each data packet with the subflow indicator, the transport frame being used to communicate each data packet between the interface and the radio network controller, and communicating the data packets between the mobile communications user equipment and the radio network controller by detecting the sub-flow indicator, and in accordance with the sub-flow indicator, arranging for the data from each of the different data fields to be communicated via a different radio access bearer providing different quality of service parameters appropriate for the different data type. In some embodiments, the forming the transport frame comprises generating a service data unit from the payload data and an internet protocol header from each data packet and combining the service data unit with the sub-flow indicator. In some embodiments, the payload data of the internet packet includes a data frame formed from an adaptive multi-rate speech coded, the data frame providing the plurality of the different types of data.

Various further aspects and features of the present inventions are defined in the appended claims and include a method for communicating internet packet data, a gateway support node, a mobile user equipment and a radio network controller.

BRIEF DESCRIPTION OF THE DRAWINGS

Embodiments of the present invention will now be described by way of example only with reference to the accompanying drawings where like parts are provided with corresponding reference numerals and in which:

FIG. 9 is a table that lists a number of Radio Access Bearer service attributes associated with the quality of service (QoS) and their corresponding RAB service attribute values (table taken from [2]);

FIG. 10 is a table listing a Wideband Adaptive Multi-Rate (AMR-WB) bit format for each of five predetermined speech codec data frame types (data taken from [4]);

FIG. 11 is a table that provides guidance for setting the number of bits in each RAB sub-flow according to the relative importance of the data (table taken from [2]);

FIG. 12 schematically illustrates the structure of a known QoS information element that specifies QoS parameters for a single UMTS bearer;

FIG. 13 schematically illustrates a PDP context information element according to the present technique that specifies QoS parameters for a first radio access bearer and has two additional optional data fields specifying different QoS parameters for different QoS options in the UMTS bearer;

FIG. 17 schematically illustrates the processing performed on data packets by the user-plane protocol stack of the RNC.

DESCRIPTION OF THE PREFERRED EMBODIMENTS

Voice Over IP

Voice over IP (VoIP) relates to the transmission of digital voice data in packets over Internet Protocol rather than using the committed circuits of the public switched telephone network (PSTN). VoIP and its associated protocols are more fully described in Annex 1 with reference to FIGS. 1 to 3 of this patent application.

Figure 1:
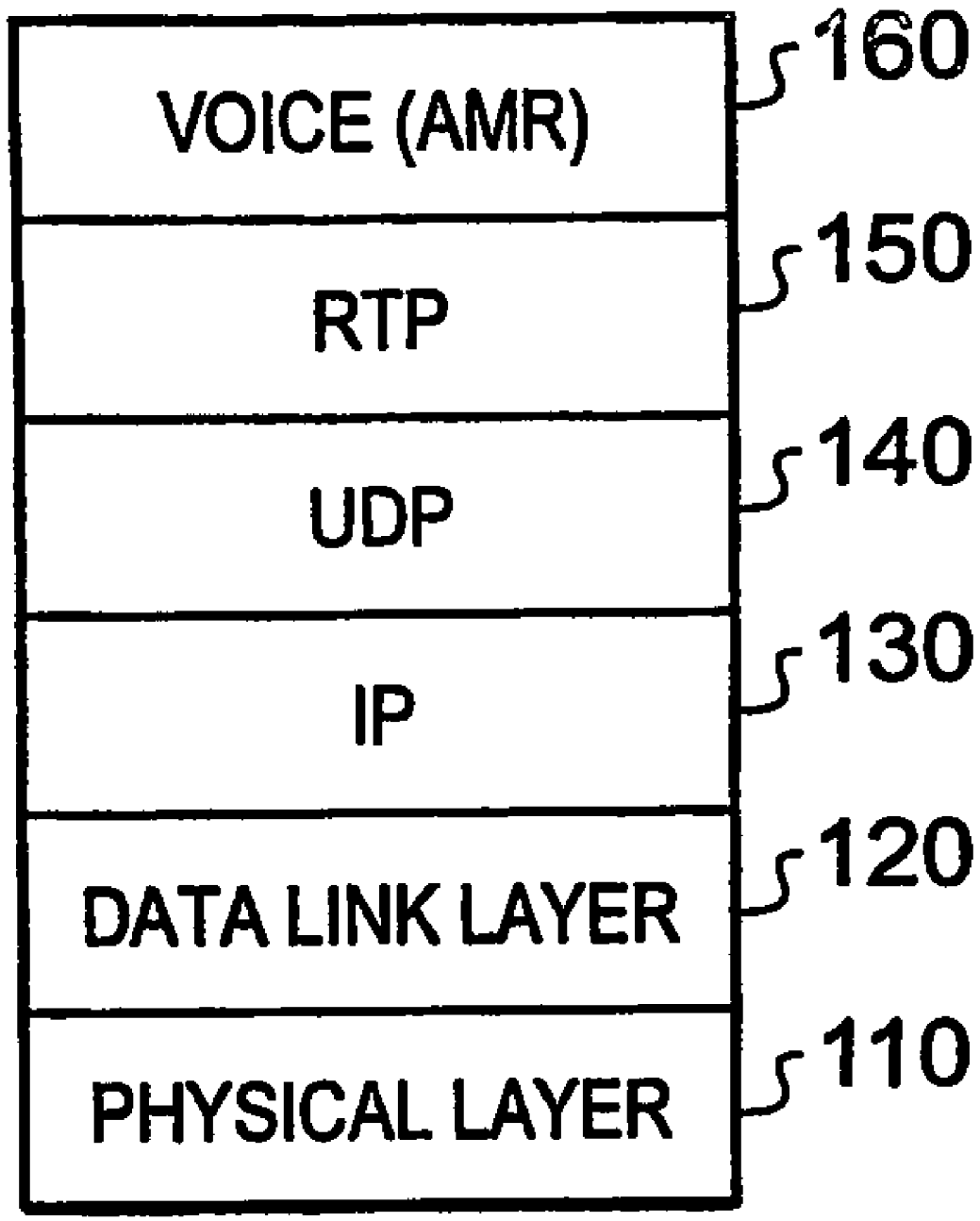
FIG. 1 schematically illustrates the structure of a VOoIP protocol stack.

FIG. 1 schematically illustrates the structure of a VOIP protocol stack. The protocol stack comprises a physical layer 110, a data link layer 120, an internet protocol (IP) layer 130, a user datagram protocol (UDP) layer 140, a real-time protocol (RTP) layer 150, a voice layer 160. More detail is provided in Annex 1.

Figure 2:
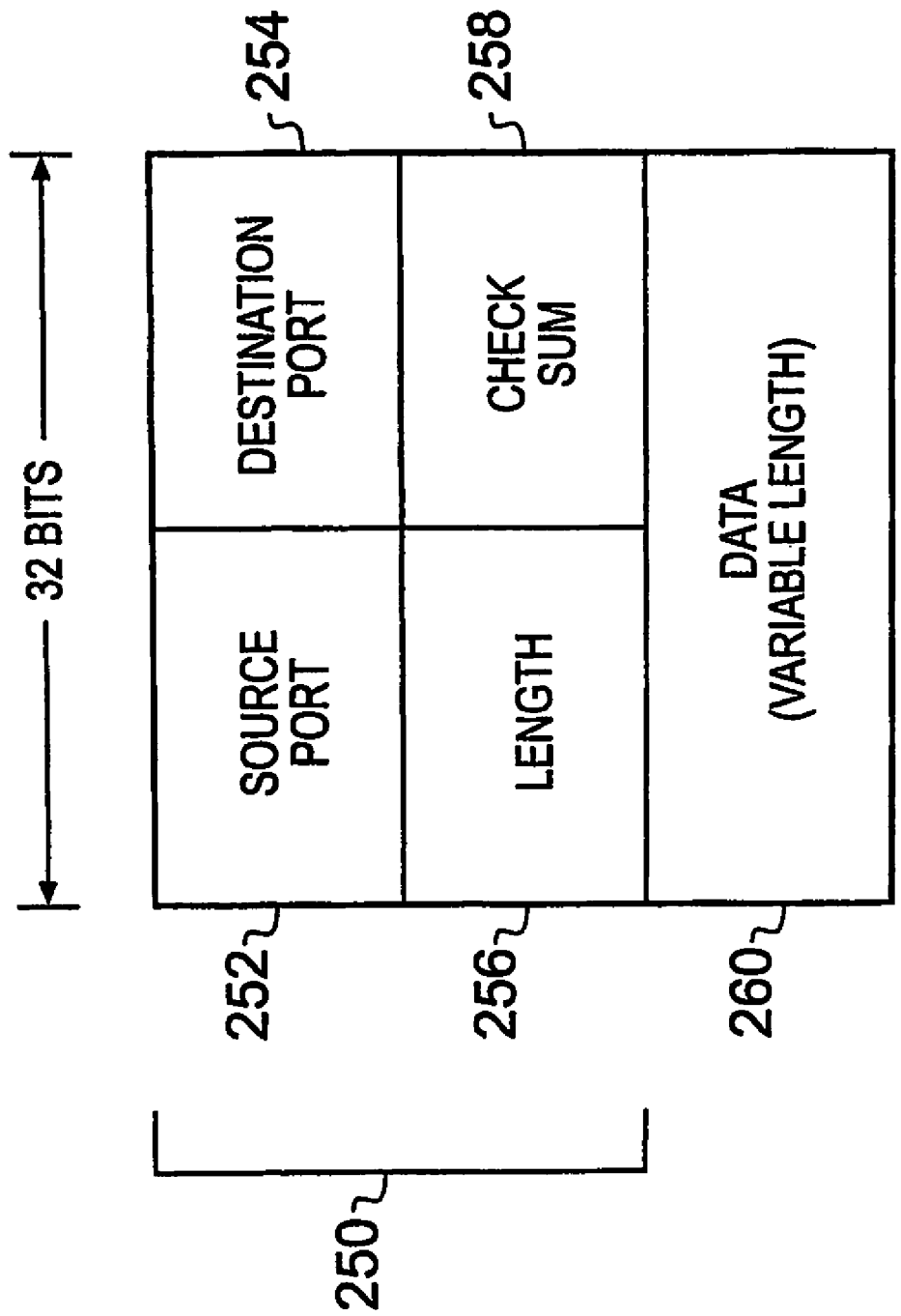
FIG. 2 schematically illustrates the structure of a UDP data packet.

FIG. 2 schematically illustrates the structure of a UDP data packet. The contents of each field of the UDP packet are described in detail in Annex 1.

Figure 3:
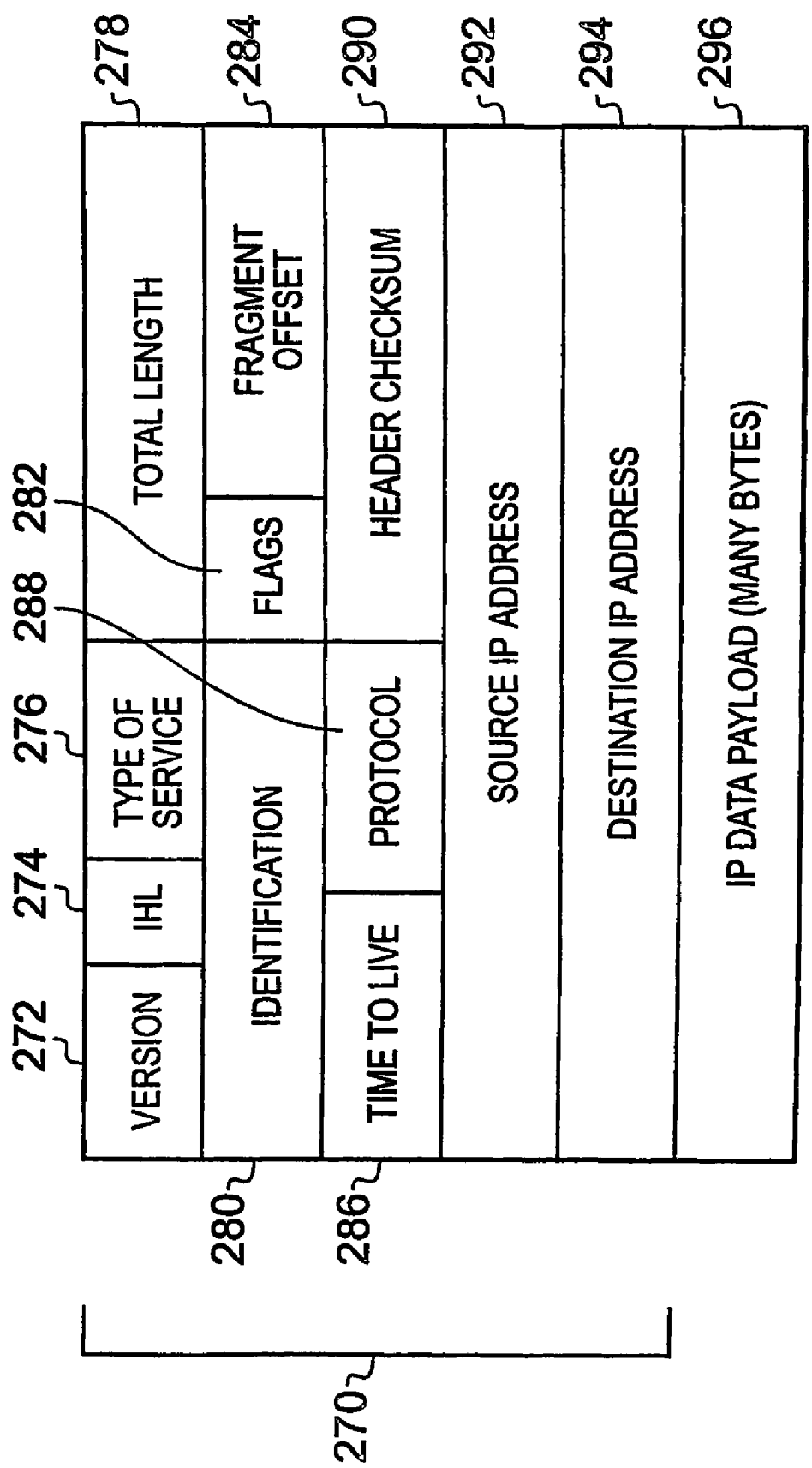
FIG. 3 schematically illustrates the structure of an IPv4 data packet.

FIG. 3 schematically illustrates the structure of an IP data packet. The contents of each field of the IP packet are described in detail in Annex 1.

Mobile Packet Radio Network Architecture

Figure 4:
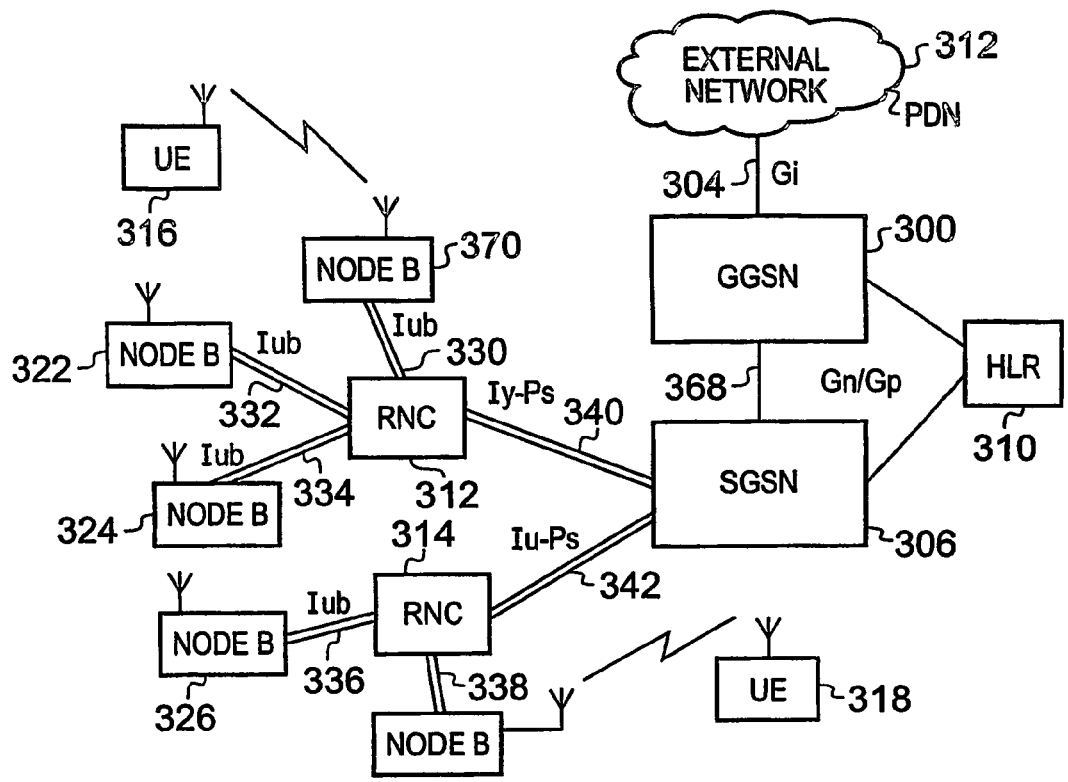
FIG. 4 schematically illustrates an example architecture of a mobile radio network which is arranged to support packet data communications.

An example architecture of a mobile radio network which is arranged to support packet data communications is provided in FIG. 4. The terminology and architecture used in FIG. 4 corresponds to that used for the UMTS and that proposed for 3G as administered by the 3GPP. In FIG. 4, a Gateway GPRS Support Node (GGSN) is connected to an—Packet Data network 302,—(PDN). The PDN includes a data communicated as packets using the Internet Protocol (IP). An interface 304 between the GGSN and the external network is labelled Gi which has been standardised although further aspects are being standardised. Also connected to the GGSN is a Serving GPRS Support Node (SGSN) 306 via an interface 308 labelled as Gn/Gp which is also being standardised.

The GGSN and the SGSN are two of network components, which are required to support GPRS. The GGSN acts as the gateway between the external packet data networks (PDN) and the mobile network, which supports GPRS. The GGSN contains sufficient information to route incoming IP data packets to the SGSN that is serving a particular UE which is mobile and receives data via a radio access facility provided by the mobile telecommunications network. For the example embodiment the radio access facility is provided in accordance with the Universal Terrestrial Radio Access Network (UTRAN) system which is specified in accordance with the—3GPP standard. The SGSN is connected to the GGSN via a Gn interface if the SGSN is within the same Public Land Mobile Network (PLMN), and connected via the Gp interface to GGSNs belonging to other PLMNs.

An SGSN provides mobility management of UEs which are moving within an area supported by the mobile radio network. To this end the SGSN is provided with access to a Home Location Register (HLR) 310. The SGSN is arranged to route data packets to Radio Network Controllers (RNC) 312, 314 for communication via the UTRAN radio access facility to mobile users UE 316, 318. The UTRAN radio access facility is provided using Node B apparatus 320, 322, 324, 326, 328, which effectively form base stations providing radio coverage for the area served by the mobile telecommunications network. The interface 330, 332, 334, 336, 338 between each RNC 312, 314 and the Node B apparatus 320, 322, 324, 326, 328, are labelled Iub and conform to an established or evolving standard. Similarly the interfaces 340, 342 between the SGSN and each RNC 312,314 are labelled as Iu-ps and is an evolving standard.

Communication of Unequally Important Data

Embodiments of the present invention provide a facility for communicating data in the form of IP packets to and from the UE 316, 318 in a way which attempts to optimise the radio resources with respect to the importance of the data in the payload of the IP packet. Data communicated within the IP packets may include sections which provide different parameters or fields of unequal importance. One example of data having fields of unequal importance is a speech-coded frame of data such as data generated by ARM codec.

It is known that AMR speech codecs produce data frames of a predetermined length which contain fields of different types of data which have different types of characteristics and/or may be of unequal importance. One example of such a speech codec is known as the Adaptive Multi-Rate Speech (AMR) codec, which has been standardised by the European Telecommunications Standards Institute (ETSI) and specified for different rates by the 3GPP (see [2]). The AMR provides a data frame having up to three data fields which are referred to as A, B and C bits, which are of different importance. The A-bits provided a basic level of audio information from which speech can be understood, although the level of fidelity produced may not be sufficient to identify the speaker. The B-bits provide a further level of fidelity as do the C-bits. Accordingly the number of A, B and C bits can be adapted in accordance with radio resources which are available to communicate the data fields. As such a different QoS may be applied to each of the different fields, examples of the fields being given in [2] which provides an example of wideband AMR (AMR-WB) coded frames for—for UMTS. For the AMR-WB, no C-bits are provided due to a restricted capacity for communicating data through wideband UMTS.

In order to determine the number of data bits in each of the three fields of an AMR data frame, it is known for a Mobile Switching Centre for a circuit switched mobile network to generate a Radio Access Bearer sub-Flow Combination Indicator (RFCI). Therefore for a packet based mobile telecommunications network a corresponding RFCI is required. For AMR data frames carried by IP packets the GGSN must identify the data bits for different fields of the AMR-frame and provide an appropriate RFCI as explained for embodiments of the invention shortly.

Figure 5:
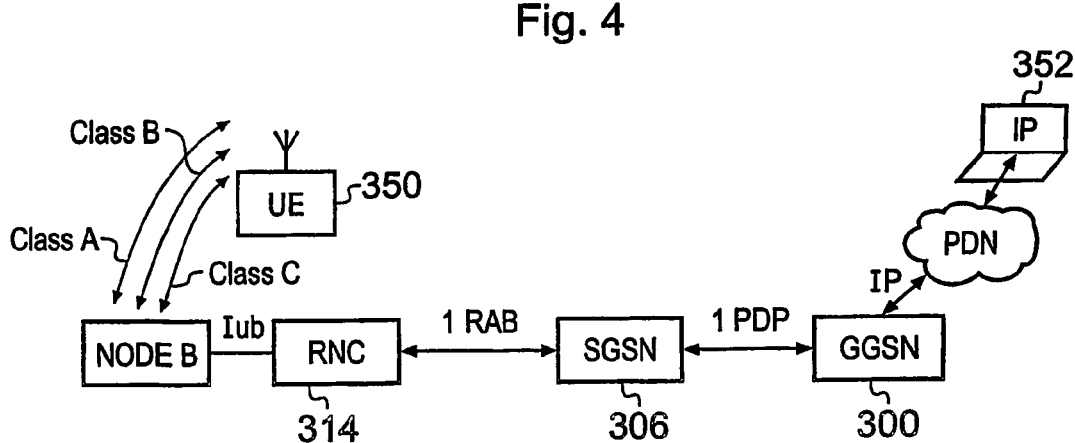
FIG. 5 schematically illustrates a simplified representation of the mobile network for supporting GPRS shown in FIG. 4.

FIG. 5 provides a simplified representation of the mobile network for supporting GPRS shown in FIG. 4. In FIG. 5, a peer-to-peer communications path is provided in accordance with embodiments of the invention for communicating data via IP packets in which the payload data includes fields of unequal importance. The IP packets are communicated between UEs 350, 352 via the GGSN 300, SGSN 306 and an RNC 314 of the mobile network of FIG. 4. As shown in FIG. 5, the data carried over IP between the RNC and the UE includes the three fields A, B and C of the AMR speech coded data frame.

With respect to the protocols within the GGSN and the SGSN, the IP packet, which is to be communicated to the UE and from the UE forms a Packet Data Unit (PDU). The form of the PDU must be known to the protocols within the GGSN, the SSGN, the RNC as well as the Node B apparatus. The PDU is a generic term referring to the form of a packet, which is communicated within the GPRS network. It is noted that the PDU is referred to as a Service Data Unit (SDU) when referring to a data packet communicated to the RLC in UTRAN, while PDU is generally used to refer to a data packet, especially to the SGSN and GGSN in the core network.

Embodiments of the present invention provide a facility for communicating data in the form of IP packets via a radio access network with the effect of improving the efficiency with which radio resources are used. To this end, the parts of a mobile radio network which support packet access are adapted to identify different data fields having different levels of importance and to establish radio access bearers having sub-flows, which provide a different QoS matched the type of the data. This is because, when IP packets carry speech coded information such as that generated by for example the AMR codecs, UTRAN needs to adapt the radio access bearers to match the relative importance of the data Each radio bearer may be optimised in accordance with the relative importance and the characteristics of the different data fields.

As specified in a 3GPP standards document 3GPP TS 23.107 [3] there are at present four different QoS types, referred to as Conventional,—Interactive and Background Classes. Embodiments of the present invention provide an adaptation of the PDP context activation request to include a request for a radio bearer having a plurality of sub-flows, each sub-flow radio bearer providing a different QoS. One example of how the radio access bearer may be provided for each sub-flow is where Un-equal Error Protection (UEP) is provided for each sub-flow radio access bearer. This is explained in more detail in the following section.

PDP Context Activation

Figure 6:
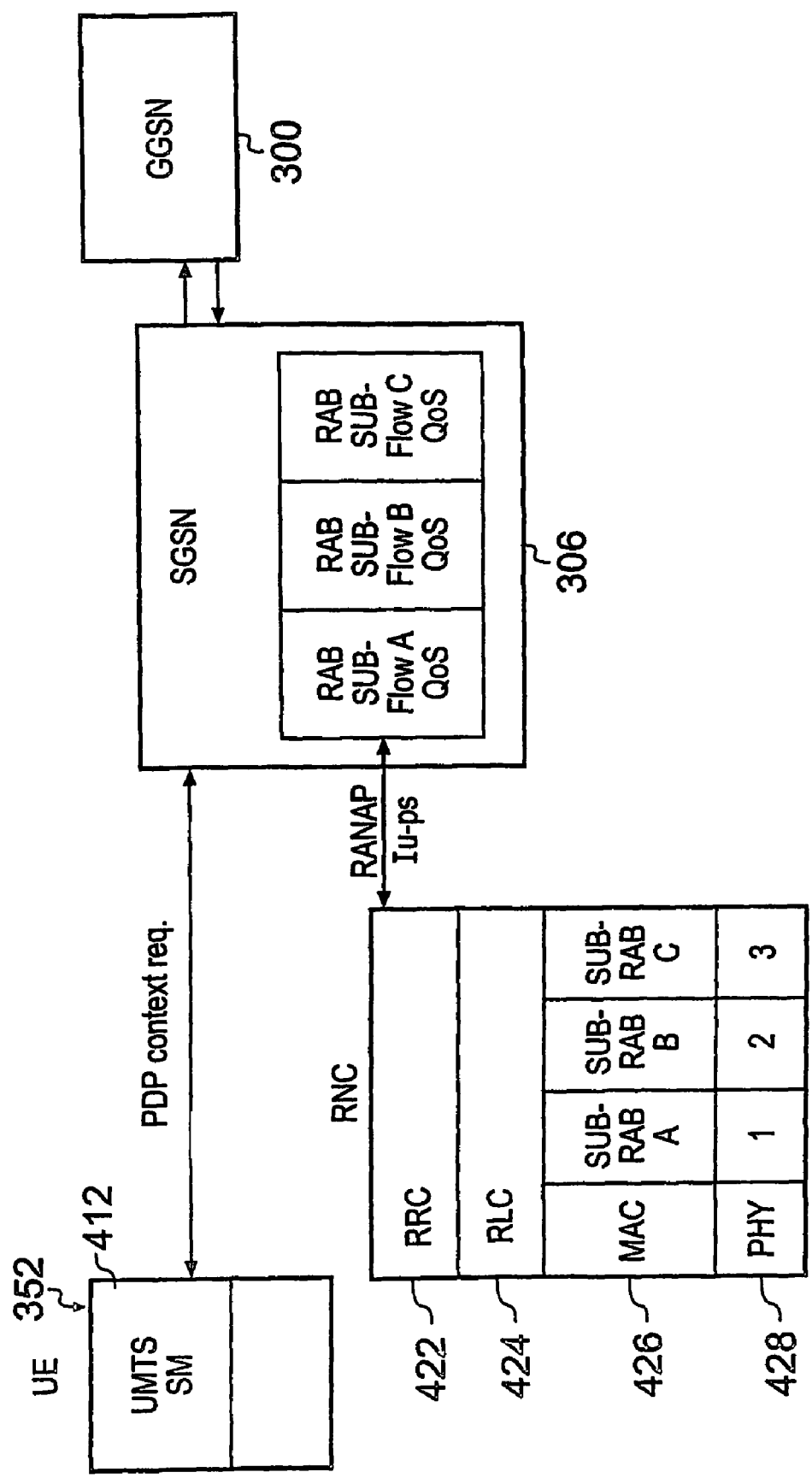
FIG. 6 schematically illustrates an arrangement for control plane communication of QoS parameters for three different categories of voice data.

FIG. 6 schematically illustrates an apparatus arrangement for control plane communication of QoS parameters for three different types of voice data. The arrangement comprises the User Equipment (UE) 352, the Radio Network Controller (RNC) 314, the Serving Global Packet Radio Service (GPRS) Support Node (SGSN) 306 and the Gateway GPRS Support Node (GGSN) 300.

The User Equipment 352 is a piece of mobile equipment having at least one UMTS subscriber identity module. An application called a UMTS session manager 412 is responsible for negotiating with the SGSN 430 for access to the radio resources. The access is mediated using a Packet Data Protocol (PDP). In order for the user to be able to transfer data a "PDP context" must be activated in the UE 352, SGSN 306 and GGSN 300. PDP context activation is initiated by an application on the user equipment 352 and is analogous to logging on to the required destination network.

The Radio Network Controller (RNC) 314 controls the use and integrity of the radio resources. It provides functionality that can be separated into four distinct layers: a Radio Resource Control (RRC) layer 422; a Radio Link Control (RLC) layer 424; a Media Access Control (MAC) 426 layer; and a physical layer 428.

The Radio Resource Control layer 422 negotiates in the control plane with the SGSN 306 to establish access to the radio resources in dependence upon a RAB set-up request from the SGSN. The Radio Link Control layer 424 sets up a connection for user data, rather than control data to pass through. The Media Access Control Layer 426 determines how the data of each data flow is transmitted. For example, it is responsible allocating and managing a dedicated channel or a shared channel (which is less wasteful of bandwidth) for the data flow. The Radio Access Bearer (RAB) sub-flows are assigned by the MAC 426. The physical layer 428 is responsible for converting data into the stream of electric or analogue pulses that will cross the transmission medium and oversees data transmission. The physical layer 428 is responsible for example for applying an appropriate error correction code to the outgoing data stream. For example, a different error correction coding level may be applied by the physical layer 428 to each of the RAB sub-flows defined by the MAC 426.

The SGSN 306 receives the PDP context activation request messages from the (UE 352 which specify the QoS requested by the user application for the desired data link. The SGSN 306 negotiates with the RNC 314 for radio access in accordance with the specified QoS parameters. The SGSN 306 stores subscription information and location information for packet switched services for each associated registered subscriber. The QoS information is communicated from the SGSN 306 to the RNC 314 using a signalling protocol called the Radio Access Network Application Part (RANAP) protocol.

RANAP is a radio network layer signalling protocol for the interface between the core network (i.e. SGSN 306) and the UTRAN. The UTRAN is the part of the UMTS network that comprises the RNC and Node-Bs. RANAP handles signalling for packet switched data between the RNC 314 and SGSN 306. It is also capable of handling signalling for circuit switched data between the RNC 314 and a—Mobile Switching Centre (not shown). The general functions that RANAP is capable of performing are: facilitating general UTRAN procedures from the core network such as paging; separating each UE on a protocol level for mobile-specific signalling management; transferring non-access signalling; performing Serving Radio Network Subsystem Relocation; and requesting and managing various types of UTRAN Radio Access Bearers (RABs). According to the present technique, RANAP is used by the SGSN to request the establishment Radio Access Bearer sub-flows in the RNC 314 in accordance with the QoS data contained in the PDP context activation request.

The GGSN 300 acts as an interface between the UMTS radio-packet backbone and the external packet data networks, that is, it provides an interface between the data network and the IP network. The packets received by the GGSN through the Gi interface are forwarded to the responsible SGSN 306. For this purpose the GGSN 300 stores the current SGSN address of the user profile in a location register. The GGSN 300 also stores subscription information and routing information for each subscriber for which it has at least one active PDP context.

Figure 7:
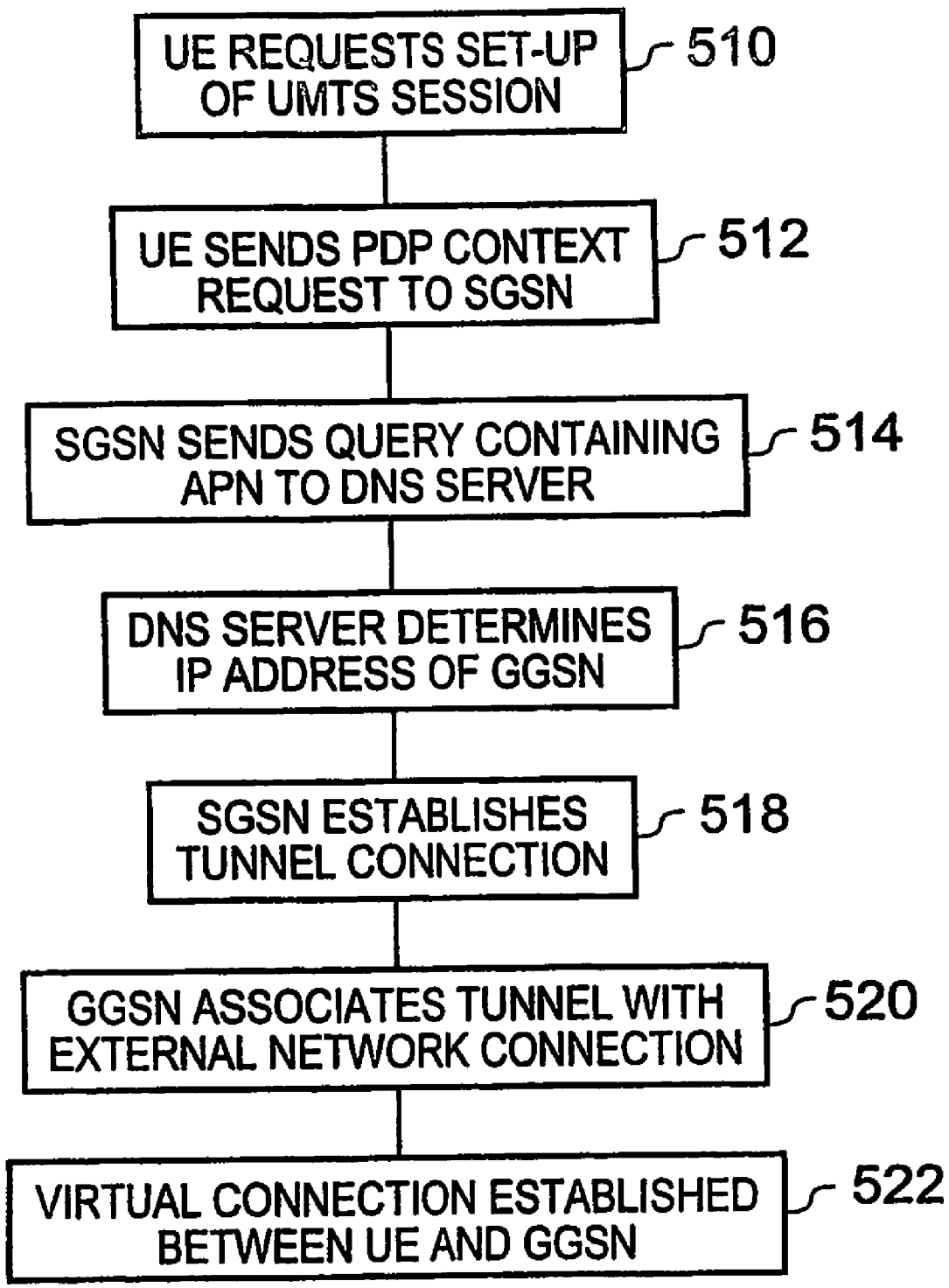
FIG. 7 is a flow chart providing an example operation of a control plane communication sequence for the arrangement of FIG. 6.

FIG. 7 is a flow chart providing an example operation of a control plane communication sequence for the arrangement of FIG. 6. At stage 510 a user application of the UE 352 initiates a PDP context request activation via the UMTS session manager 412. The Context Activation procedure itself requires allocation of radio resources. At stage 512 the UE 410 sends the "activate PDP context" request to the SGSN 306. An information element contained in the PDP context request has a required field that specifies QoS parameters for the A-bits and has two additional optional fields for specifying independent QoS parameters for the B-bits and—the C-bits. The PDP context activation message additionally comprises the access point name of the external network to which connectivity is requested, user identity information and IP configuration parameters. At stage 514 the SGNS 306 receives the PDP context request and validates the user from a subscription record. If the request is valid then the SGSN 306 sends a query containing the requested access point name to a domain name server (not shown). At stage 516 the domain name server uses the supplied access point name information to determine the address of at least one GGSN 300 that will provide the required connectivity to the external network. The IP address of the selected GGSN 300 is supplied to the SGSN 306. At stage 518 the SGSN uses the supplied GGSN IP address to request a virtual connection channel to the GGSN 300 using a GPRS tunnelling protocol. A connection Tunnel is a predefined virtual channel across which encapsulated user data can be transmitted. At stage 522 the GGSN receives the connection tunnel request and establishes the requested tunnel and returns an IP address to be conveyed to the UE 352. Accordingly a virtual connection is established between the UE 352 and the GGSN 300. The GGSN 300 has a further association between the connection tunnel and the physical interface to the external network. Accordingly, data transfer is enabled between the UE 352 and the external network.

Figure 8:
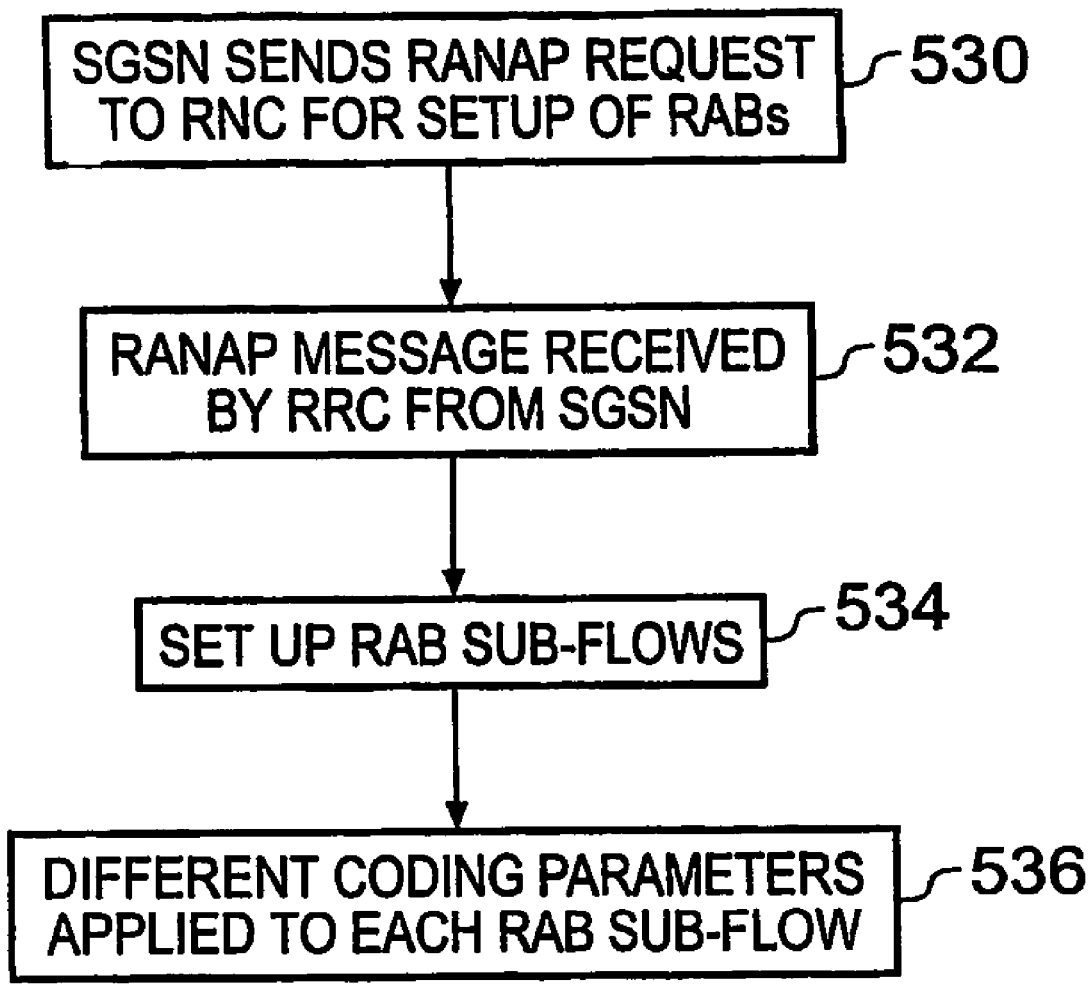
FIG. 8 is a flow chart showing further stages of the control plane communication sequence for the arrangement of FIG. 6.

FIG. 8 is a flow chart that schematically illustrates the control plane negotiations between the SGSN 306 and the RNC 314 for the allocation of radio resources according to distinct QoS requirements for the A-bits, B-bits and C-bits of the voice data. At stage 530, on receipt of the PDP context information element specifying three independent sets of QoS parameters for the A, B and C bits respectively, the SGSN 306 sends a RANAP request to the RNC 314 requesting the set-up of a Radio Access Bearer for the data transfer requested by the user application. At stage 532 the Radio Resource Control Layer 422 of the RNC 314 receives the RANAP request and passes the request to the Media Access Control layer 426. At stage 534 the MAC layer established three independent RAB sub-flows for the A-bits, the B-bits and the C-bits respectively. Each sub-flow has a predefined. The category of sub-flow selected is specified by the RANAP for each of the three voice categories. Finally at stage 536 the physical layer parameters are separately configured for each of the three sub-flows. In particular a different level of error protection is applied to each of the three sub-flows.

To support unequal error protection (i.e. different levels of error protection for different classes of voice data bits) a number of QoS parameters should be separately configured for each class of voice bits (A-bits, B-bits and C-bits). The RAB assignment procedure is initiated by the SGSN 306 based on information in the PDP context request. The RNC 314 then establishes the UMTS radio access bearers according to the QoS parameters. Only a single RAB can be allocated per PDP context request but the single RAB is sub-divided into one or more RAB coordinated sub-flows. Table 1 below lists a number of RAB service attributes associated with the QoS and their corresponding RAB service attribute values. The table gives the RAB parameters for wideband adaptive multi-rate coding (as given in table 5.1 of [2]). According to the present technique the same predefined RAB parameters may be used for packet switched voice as for circuit switched voice. It can be seen from Table 1 that a first RAB sub-flow is associated with the A-bits and a second RAB sub-flow is associated with the B-bits. The residual bit error ratio for the first RAB sub-flow is $10^{-6}$ whereas the residual bit error ratio for the second RAB sub-flow is $10^{-3}$. This reflects that the error correction level applied to the A-bits is higher than the error correction level applied to the B-bits. The service data unit (SDI) format is such that for each of five predetermined speech codec data frame types (1 through 5) a different number of bits are allocated to each voice data class A, B and C. An example of the bit allocations for each frame type is listed in Table 2 for W-AMR. This data set was taken from [3]. The number of RAB sub-flows and their associated attributes such as residual bit error ratio and delivery of erroneous SDUs are defined at the stage of RAB establishment in the SGSN 430 based on the information element of the PDP context request. The RAB sub-flow attributes are signalled to the RNC 314 using the RANAP radio access bearer establishment request as illustrated in FIG. 6. The total number of bits in all sub-flows for one RAB sub-flow combination (RFC) should correspond to the sum of the bit-allocations for the A, B and C bits specified in Table 2 for the corresponding generic wideband AMR codec mode (associated with the frame type). Table 3, which is taken from [2], provides guidance for setting the number of bits in each RAB sub-flow according to the relative importance of the data.

FIG. 12 schematically illustrates the structure of a known QoS information element that specifies QoS parameters for a single radio access bearer as specified in [5]. The information element comprises 13 octets of data specifying various QoS parameters associated with the given radio access bearer.

FIG. 13 schematically illustrates a PDP context information element according to the present technique that specifies QoS parameters for a first radio access bearer and has two additional optional data fields specifying different QoS parameters for distinct RAB sub-flows. It can be seen that the spare bits 5 to 8 of octet 5 in the existing standard QoS information element of FIG. 12 have been utilised as optional QoS information bits in the modified QoS information element according to the present technique. The modified QoS information element comprises two additional optional fields. Optional field 1 occupies octets 14 to 22 of the information element. Octets 14 to 22 are of the same format as octet 5 to octet 14. Optional field 2 occupies octets 23 to 31 of the information element. Octets 23 to 31 are also of the same format as octet 5 to octet 14. If bit 8 of octet 5 is set equal to zero this indicates that no optional data field 1 or optional data field 2 exists. However, if bit 8 of octet 5 is set equal to 1 this indicates that at least optional field 1 and possibly optional field 2 is present in the information element. QoS optional field 1 may be used to specify QoS parameters for the RAB sub-flow of the A-bits and optional field 2 may be used to specify QoS parameters for the RAB sub-flow of the B-bits.

User Plane Adaptation

Figure 14:
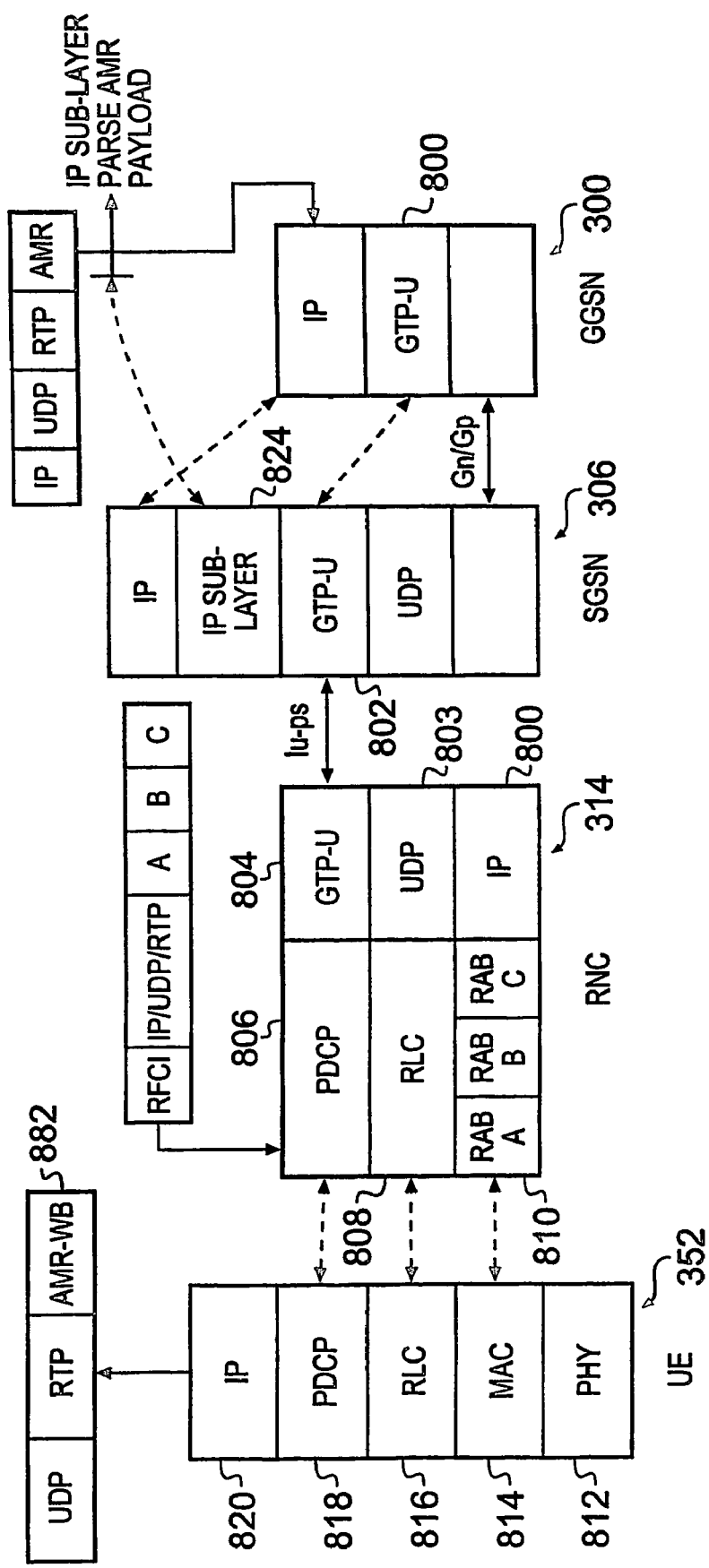
FIG. 14 schematically illustrates the protocol stacks within the user plane that facilitate communication of voice data IP packets to and from the UE.

Having established the radio access bearers for each of the data fields within the payload of IP packets, FIG. 14 provides an illustration of protocol stacks within the GGSN 300, SGSN 306, RNC 314 and UE 352 which are adapted to facilitate communication of these IPs to and from the UE.

The GGSN 300, the SGSN 306 and the RNC include at a link layer the GPRS tunnelling protocol (GTP) which communicates both user data (GTP-U) and signalling data (GTP_C). The GTP-U tunnels user data between the GGSN, SGSN and the RNC.

Figure 15:
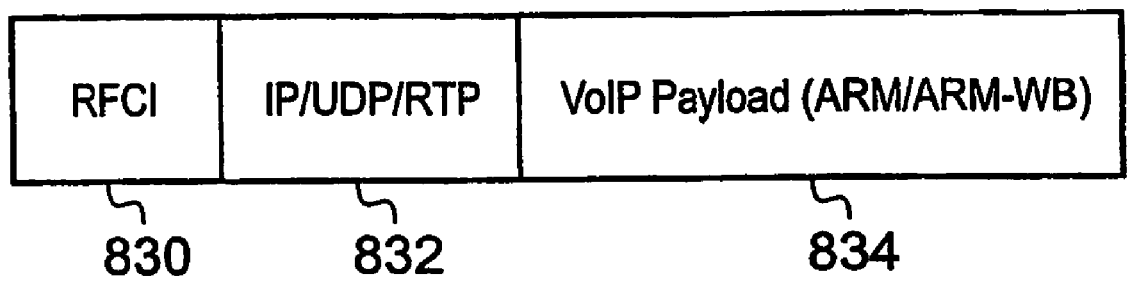
FIG. 15 schematically illustrates the structure of an Iu-ps frame for VoIP.

Transport protocols carry GTP data units via the GGSN, SGSN and RNC. For the example embodiments these data units across the Iu-ps interface will be referred to as Iu-ps frames. FIG. 15 schematically illustrates the structure of an Iu-ps frame. The Iu-ps frame comprises an RAB sub-flow combination index (RFCI) portion 830, an IP/UDP/RTP header portion 832 and a VoIP payload 834 of adaptive multi-rate coded voice data. Transport protocols include the User Datagram Protocol (UDP) which communicates Iu-ps frames using the Internet Protocol from the GGSN to the UE. In essence as shown in FIG. 14, the GTP-U conveys the Iu-ps frames between the SGSN and the RNC using lower layer protocols which are known to those familiar with the GRPS/UMTS architecture and disclosed in [1] and so these will not be produced here. However, the abbreviations that have been used in FIG. 14 to present protocols and layers for communication of IP packets in the RNC and UE are summarised as follows:

For the RNC:

S Layer 800 is the IP transport layer utilising the Internet Protocol to communicate data in packet form;

Layer 803 is the control protocol layer utilising the User Datagram Protocol for transporting IP packets;

Layer 804 is the GTP-U protocol;

Layer 806 is the Packet Data Convergence Protocol (PDCP) layer which maps network level protocols onto link layer protocols such as Radio Link Control (RLC) layer for transport on the radio access bearers. PDCP is capable of performing IP header compression and decompression. The header compression method is specific to the particular network layer, transport layer and upper layer protocol used e.g. RTP/UDP/IP.

Layer 808 is the RLC layer which maps the data from the PDCP layer onto the radio access bearers;

Layer 810 is the Media Access Control (MAC) sub-layer which maps the data from each radio access bearer onto UTRAN physical radio channels;

For the UE:

Layer 812 PHY represents the physical layer including transmission on the physical radio channels provided in accordance with UTRAN from the RNC via Node B apparatus;

Layer 814 is the MAC layer corresponding to that in the RNC;

Layer 816 is the RLC corresponding to the RLC sub-layer in the RNC;

Layer 818 is the PDCP sub-layer corresponding to the PDCP layer in the RNC.

Returning to the GGSN 300—receives an IP packet from the external network as illustrated in FIGS. 4 and 5 and forwards it through GTP_U to the SGSN. An IP processing sub-layer 824 in SGSN 306, parses the IP packet data field to identify the number of bits which are present in the different un-equally important data fields. For the example of a data frame from the AMR speech codec, the parsing provides the number of bits in the A, B and C fields according to a predetermined number of bits within these fields. From the number of bits present in the different fields, the IP processing sub-layer generates an RFCI field providing an indication to each of the other network elements SGSN, RNC, UE which of a predetermined set of data formats the data frame represents. According to this information, the different un-equally important data fields can be mapped onto the appropriate radio access bearers.

The IP sub-layer 824 parses the IP payload. The PDCP in the RNC compresses the header of the IP data packet. Once the bit format is understood by the SGSN, it will be able to generate the RFCI and then the Iu-ps format.

The Iu-ps frame is formed from the RFCI and the SDU by the IP processing sub-layer 824. The Iu-ps frame is therefore in a form in which it can be transmitted via the SGSN 306 to the RNC 314 via the IP transport layer 800 of the RNC, the UDP layer 802 to the GTP-u layer 804. Within the PDPC layer 806 of the RNC, the—IP header and UDP/RTP fields are removed by the PDPC 806 before the remaining data within the SDU is transported via the RLC and MAC layers to the UE. The zero-byte header compression is performed in accordance with RFC 3243.

The data from the different fields, which for the AMR-flame comprises the A, B and C bits are transmitted via different sub-flows in the radio access bearer RAB sub-flow A, RAB sub-flow B, RAB sub-flow C, each providing a different QoS which is matched to the importance and characteristics of the data from each field.

Embodiments of the present invention provide an advantage in that no change is required within the architecture of the RNC in order communicate data from IP packets having data with different fields of un-equal importance. Accordingly, since the RNC can detect the RFCI provided with the SDU, the payload data can be matched to the appropriate bearer.

At the UE, after the communicated data has passed through the PHY layer 821, the MAC layer 814 and the RLC layer 816, the PDCP layer re-applies an IP/UDP/RTP header to the data so that an IP packet which conforms to the IP protocol can be passed to the application layer 352 such as SIP applications.

Figure 16:
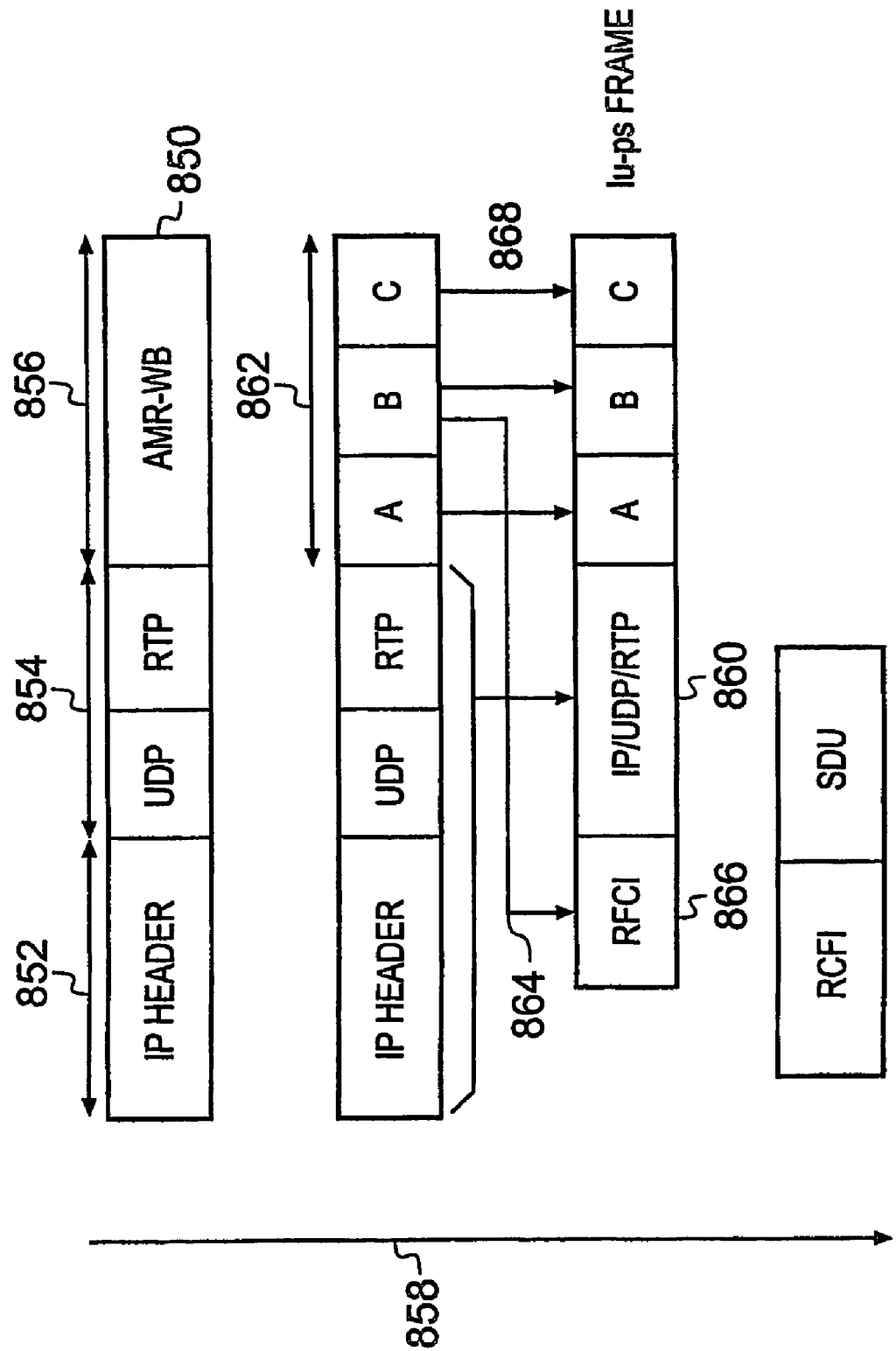
FIG. 16 schematically illustrates the processing performed on data packets by the user-plane protocol stack of SGSN.

In summary an IP packet containing for example an AMR speech frame is transported through the mobile radio network using the following operations, which are represented in FIGS. 16 and 17.

FIG. 16 schematically illustrates the processing performed on data packets by he user-plane protocol stack of the GGSN. As shown in FIG. 16, in the GGSN an IP packet 850 containing an IP header 852, UDP/RTP fields 854 and a data field providing an AMR-WB speech coded frame 856 is received in the IP processing layer 824. The received IP packet is then processed as represented by an arrow 858, in accordance with the following operations:

The IP processing sub-layer 824 parses the AMR speech codec field 856 as represented by arrows 862. As a result of the parsing, the number of bits in each of the A, B, C data fields are identified, from which an RFCI 866 identifying the AMR speech codec frame can be generated. As represented by an arrow 864, the IP processing layer generates an RFCI which is appended to the VoIP packet to form a separate field 866 in the Iu-ps frame.

The IP processing layer 824 of the GGSN (see FIG. 14), then forms the remainder of the Iu-ps frame from the A, B, C-bits of the AMR speech frame, as illustrated by arrows 868.

The Iu-ps frame is then transported from the SGSN 306 to the RNC 314 in accordance with the IP protocol, via the various protocol layers including the GTP-U.

When the Iu-ps frame is received at the GTP-U protocol layer 804 in the RNC 314, the Iu-ps frame is passed to the PDCP for processing before transmission via the radio access interface via the Node B apparatus to the UE 352.

FIG. 17 schematically illustrates the processing performed on data packets by the user-plane protocol stack of the RNC. As illustrated by a process step 870, the Iu-ps frame is received by the PDCP layer 806 of the RNC which then removes the—IP/UDP/RTP Header 860, before passing the remainder of the SDU to the RLC layer 808 as illustrated by the arrow 872. The RLC layer 808 then uses the RFCI 866 to separate the A, B, and C data fields, which is illustrated by an arrow 874. As illustrated by the arrows 876, the A, B and C data fields are transported via respectively radio access bearers RAB A, RAB B and RAB C in the MAC layer 810 to the UE 812.

Within the UE 352, the AMR speech frame is reformed in the RLC layer 816 after transport via the PHY layer 812 and the MAC layer 814. The PDCP layer 818 then regenerates the IP/UPD/RTP headers which is passed to the application layer 820 of the UE.

Various further aspects and features of the present invention are defined in the appended claims. Various modifications can be made to the embodiments herein described without departing from the scope of the present invention.

REFERENCES

[1] R. Steele, C-C Lee and P. Gould, "GSM, cdmaOne and 3G Systems," published by Wiley International ISBN 0 471 491853

[2] 3GPP TS 26.202 V5.1.0 (September-2002)

[3] 3GPP TS 23.107

[4] 3GPP TS 26.201 V1.1.0 (December-2000)

[5] 3GPP TS 24.008

ANNEX 1

Voice over Internet Protocol (VoIP) relates to the transmission of voice data in packets. A packet is a discrete unit of digital user data appended to a header that specifies how the packet should be routed. The packet may vary both in length and in duration. By way of contrast, telephony-based traffic is circuit-switched rather than packet-switched and each data unit is of fixed length and fixed duration. Packet switching of voice data is motivated by the desire for the integration of voice, data and video traffic as demanded by multi-application software. Integration of voice and data traffic allows for more efficient use of communication channel bandwidth. Circuit-switched telephony systems typically use a time division multiplexing scheme (TDM) to allocate bandwidth. In such TDM schemes a telephone user is allocated bandwidth continuously in fixed channelised timeslots, even when the user is not talking. Considering that around 50% of a normal conversational speech pattern is silence (due to talking in turns, pausing to consider an idea etc.) the TDM approach of continuous bandwidth allocation is wasteful. VoIP is an example of a scheme that due to packet-switching, allows bandwidth to be used only when needed during active parts of a conversation but to be allocated to other users during silent portions of a conversation. This more efficient bandwidth allocation scheme is known as Statistical TDM (STDM). A further advantage of packet switched voice is that the bit-rate of a packet based speech channel can feasibly operate at 4.8 to 8 kbits per second whereas circuit switched TDM channels require a data rate of 64 kbits per second.

Traditional circuit-switched telephone networks tend to have hardwired structures (64 kbit/s TDM architecture) that are not easily amenable to change. For example, although low bandwidth codecs operating in the 5-8 kbit/s range have been available for some years the rigidity of the telephone networks the telephone switches and other components could not take advantage of these. A codec (coder/decoder) translates an analog voice signal into digital samples for transport across a packet network. VoIP is an infrastructure that supports change and allows more flexibility in the service levels provided. For example, using VoIP there is the possibility for negotiation of the data rate, coding technology used, IP addresses, port numbers and QoS requirements such as maximum delay.

Internet Protocol (IP) supports data packet communication on the Internet. The Internet is designed as a connectionless system, which means that there is no fixed path between source and destination host machines. Accordingly, IP traffic routing is stateless in that no data tables are maintained about a given connection because there is no fixed connection. This is very different from the circuit-switched telephone network in which connection-oriented fixed paths are set up between called and calling parties. Such a fixed connection is designed to support the real-time short-delay requirements of speech. The Internet, having been designed for data rather than voice traffic, is a "best effort" delivery network. This means that if problems occur during attempted delivery of data (e.g. due to network congestion or data corruption due to noise) or if the destination host cannot be found, the packets may be discarded.

For packet voice data to be translated back from a digital to an analogue signal in a real-time mode, the two-way delay for voice packets should be constant and generally should be less than 300 ms so that the user does not perceive any unnatural delay in the conversation. However standard (non-voice) data packets can be transmitted asynchronously throughout the network without regard to timing arrangements between sender and receiver. In comparison to standard data traffic, voice packets exhibit a high tolerance for errors. In particular up to 5% of voice data packets can be lost without severely affecting the fidelity of voice reproduction. The size of voice packets produced by most low-bit-rate voice codecs is very short, usually no more than 10-30 bytes (corresponding to 10-30 ms in duration). A typical IP header which is appended to the voice packet is about 20 bytes long. The use of small voice data packets has the advantage of reducing the processing delay in the routers.

Most user traffic on the Internet is transported with a Transmission Control Protocol (TCP) header because TCP provides comprehensive support for data integrity operations including error checks, acknowledgement of receipt of data, retransmission of lost or erroneous data and flow control management. However the comprehensive TCP support features introduce an overall delay of 400-500 ms, which is unacceptable for the real-time performance required of speech. Also TCP has the disadvantage in terms of voice traffic that it delays packet transmission when the network is congested. For this reason a different protocol known as User Datagram Protocol (UDP) is used for voice traffic.

TCP is a connection-oriented protocol, which means that before any data is transferred between network nodes, the sending and receiving devices must co-operate in the establishment of a bi-directional communication channel. Subsequently, each package of data sent across the local network receives an acknowledgement and the sending device records status information to ensure that each data package is received without errors.

In contrast, UDP is a connectionless protocol, which means that a one-way data packet is sent by the sending device without notifying the receiving device that the data is en route. On receipt of each data packet, the receiving device does not return status information to the sending device. Although TCP, being a connection-oriented protocol, is more reliable than UDP, the additional error checking and flow control performed by TCP means that it is slower than UDP. Furthermore, UDP continues to transmit packets even when the network is congested.

FIG. 1 schematically illustrates the structure of a VoIP protocol stack. This provides an illustration of how VoIP operates with other Internet protocols. The protocol stack comprises a physical layer 110, a data link layer 120, an internet protocol (IP) layer 130, a user datagram protocol ((UDP) layer 140, a real-time protocol (RTP) layer 150, a voice layer 160.

The physical layer 110 defines the media and physical aspects of the signals (e.g. voltages). It also defines clocking and synchronisation operations and physical connectors. The error correction coding of data is a physical layer procedure. The data link layer 120 supports transfer of traffic over one data link. Depending on the particular protocol employed at this layer error detection and retransmission may be performed. The IP layer 130 is responsible for how data packets (sometimes know as datagrams) are created and transported across a network. IP performs one set of tasks when transmitting data and another set of tasks when receiving data. On transmission of data the IP layer determines whether the destination address is local (i.e. on the same network) or remote. IP can initiate direct communication for local destinations but must communicate via a gateway (router) if the destination is remote. On receipt of data at the destination network node IP verifies that the data packet has not been corrupted in transit and verifies that the data has been delivered to the correct destination. IP then checks the contents of data fields within the IP datagram to determine what instructions the source IP has sent. These instructions will typically be to perform some function such as to deliver the data to the next higher layer in the protocol stack, in this case the UDP layer 140. FIG. 3 (described below) illustrates the structure of an IP data packet.

The UDP layer 140 serves principally as a multiplexer/demultiplexer for the transmission and receipt of IP traffic. The UDP datagram contains a destination port number and a source port number. The destination port number is used by UDP and the operating system of the receiving device to deliver the traffic to the proper recipient (e.g. the appropriate application program). The UDP port number and the IP address are concatenated to form a "socket". The concatenated address must be unique throughout the Internet and a pair of sockets identifies each end-point connection. Some VoIP based call processing protocols cannot effectively function without access to the port numbers. For example Session Initiation Protocol (SIP), which is typically used for call set-up and tear-down, functions specifically to support passing of port numbers between applications that will be used during a packet telephone call. FIG. 2 (described below) illustrates the structure of a UDP data packet.

The RTP layer 150 provides functions to support real-time traffic, that is, traffic that requires time-sensitive reproduction at the destination application. The services provided by the RTP layer 150 include payload type identification (e.g. audio traffic), sequence numbering, time-stamping and delivery monitoring. RTP supports data transfer to multiple destinations via multicast distribution if provided by the underlying network. The RTP sequence numbers allow the receiver to reconstruct the original packet sequence. The sequence numbers may also be used to determine the proper location of a packet. RTP does not provide any mechanism to ensure timely delivery, nor does it provide other QoS guarantees. Rather lower layers are relied on to provide such guarantees. Although the voice data may in principle sit directly over IP or over IP then UDP, technically, the best alternative is that shown in the protocol stack of FIG. 1, i.e. voice over IP then UDP then RTP.

FIG. 2 schematically illustrates the structure of a UDP datagram comprising a header 250 and a data payload 260. The datagram header 250 comprises four 16-bit fields: a source port field 252; a destination port field 254; a length field 256 and a check sum field 258. The source port field 252 typically holds the appropriate UDP port number of the sending device. The source port field value, where provided, is used as a return address by the receiving device. Provision of a valid source port field is optional. The destination port field 254 specifies the UDP port address on the receiving device to which the datagram should be delivered. The length field 256 specifies the total length (header plus payload) in octets of the UDP datagram. The checksum field 258 is used to establish whether the datagram was corrupted during transmission. The data payload 260 is variable in length. UDP provides a means of transmitting messages of up to 64 kbytes (the maximum packet size permitted by IP) in size. The UDP header 250 does not include the source or destination IP addresses, only the UDP port addresses, however the checksum data includes destination IP address information that allows a receiving device to determine whether a UDP datagram has been incorrectly delivered.

FIG. 3 schematically illustrates the structure of an IP datagram comprising a header 270 and a data payload 296. The IP datagram header 270 comprises 12 distinct fields, which are 4, 8, 16 or 32 bits in length. IP on the source network device (computer or mobile terminal) constructs the IP header 270 and IP at the destination examines the contents of the IP header to determine what to do with the data payload of the IP datagram. A significant amount of information is contained in the IP header including the IP addresses of the source host and destination host. A version field 272 indicates which version of IP is being used. An Internet header length (IHL) field 274 contains 4-bits specifying the length of the IP header in 32-bit words. Typically a header contains 20 bytes, in which case, the IHL value would be 5. Note that the header length is not fixed. A type of service field (TOS) 276 allows the source IP to designate special routing information such as low or normal delay, normal or high throughput, and normal or high reliability. A precedence value, which ranges from a lowest precedence of 0 to a highest precedence of 7 indicates the relative importance of the datagram. The precedence value is used to implement flow control and congestion mechanisms in a network by enabling routers, servers and host nodes to determine in which order to discard datagrams in the event of network congestion. A total length field 278 specifies the total length of the IP datagram (i.e. header plus payload) in octets. The maximum possible length of a datagram is 216 bytes. An identification field 280 contains an incrementing sequenced-number assigned to IP datagrams by the source IP. A flags field 282 indicates fragmentation possibilities for the data. A "don't fragment" (DF) flag specifies whether or not fragmentation is allowed. A more fragments (MF) flag signifies that the associated datagram is a fragment. When MF=0 either no more fragments exist or the data was never fragmented. A fragment offset field 284 is a numerical value assigned to each successive fragment that is used at the IP destination to reassemble the received fragments in the correct order. A time to live field indicates the amount of time either in seconds or in router hops that the IP datagram can survive before being discarded. On passage through the network, each router examines and decrements this field e.g. by the number of seconds that the datagram is delayed inside the router. The datagram is discarded when this field reaches a value of zero. A protocol field 288 holds the protocol address to which IP should deliver the data payload: a protocol address of 1 corresponds to Internet Control Message Protocol (ICMP); a protocol address of 6 corresponds to Transmission Control Protocol (TCP): and a protocol address of 17 corresponds to User Datagram Protocol (UDP). A header checksum field 290 contains a 16-bit value used to verify the validity of the header. The header checksum value is recomputed in every router as the time to live field 286 decrements. Checks are not performed on the user data stream. A source IP address field 292 is used by the destination IP to send a response to the source IP. A destination IP address field 294 is used by the destination IP to verify that it has been delivered to the correct destination. The IP data payload filed 298 contains a variable amount of data, possibly thousands of bytes, destined for delivery to TCP or UDP.

The invention claimed is:

1. A telecommunications system for providing a facility for communicating internet packet data with a mobile communications user equipment, the internet packet data carrying payload data including a plurality of different data types, the system comprising a gateway support node operable to provide an interface for communicating the data packets between the mobile communications user equipment and a packet data telecommunications network, a service support node operable to communicate the data packets between the gateway support node and the mobile communications user equipment using a radio network controller, the radio network controller being operable to provide a radio access bearer for communicating the data packets with the mobile communications user equipment, wherein at least one of the gateway support node and the mobile communications user equipment are operable to parse the payload data in each data packet to determine a number of the plurality of different data types and a number of data symbols in each of the different data types, to generate a radio access bearer sub-flow indicator providing an indication of the number of different types of data in the payload and the number of symbols in each different data type, to form a transport frame for each data packet by combining the payload data for each data packet with the sub-flow indicator, the transport frame being used to communicate each data packet between the gateway support node and the radio network controller via the service support node, and the data packets are communicated between the radio network controller and the mobile communications user equipment by detecting the sub-flow indicator, and in accordance with the sub-flow indicator arranging for the data from each of the different data fields to be communicated via a different radio access bearer providing different quality of service parameters appropriate for the different data type.

2. A telecommunications system as claimed in claim 1, wherein at least one of the gateway support node and the mobile communications user equipment are operable to form the transport frame by generating a service data unit from the payload data and an internet protocol header from each data packet, and combining the service data unit with the sub-flow indicator.

3. A telecommunications system as claimed in claim 2, wherein the mobile communications user equipment and the radio network controller each include a packet data protocol layer which is operable to remove the internet protocol header from the service data unit before communication, and to add the internet protocol header to the service data unit after communication of the payload data via each of the sub-flow radio access bearers.

4. A telecommunications system as claimed in claim 2, wherein the internet header is compression encoded before being combined with the payload data to form the service data unit.

5. A telecommunications system as claimed in claim 4, wherein the compressed internet protocol header is decompressed when removed from the service data unit to reform the internet packets within the gateway support node.

6. A telecommunications system as claimed in claim 1, wherein the payload data of the internet packet includes a data frame formed from an adaptive multi-rate speech coded, the data frame providing the plurality of the different types of data.

7. A telecommunications system as claimed in claim 1, wherein the mobile radio telecommunications network is operable in accordance with the General Packet Radio System (GPRS), the gateway support node being a gateway GPRS support node, and the service support node being a service GPRS support node.

8. A method for communicating internet packet data with a mobile communications user equipment, the internet packet data carrying payload data including a plurality of different data types, the method comprising providing an interface for communicating the data packets between the mobile communications user equipment and a packet data telecommunications network, communicating the data packets between the interface and the mobile communications user equipment using a radio network controller, the radio network controller being operable to provide radio access bearers for communicating the data packets to and/or from the mobile communications user equipment, wherein the communicating the data packets between the interface and the mobile communications user equipment comprises parsing the payload data in each data packet to determine a number of the plurality of different types of data and a number of data symbols in each of the different data types, generating a radio access bearer sub-flow indicator providing an indication of the number of different types of data in the payload and the number of symbols in each different data type, forming a transport frame for each data packet by combining the payload data for each data packet with the sub-flow indicator, the transport frame being used to communicate each data packet between the interface and the radio network controller, and communicating the data packets between the mobile communications user equipment and the radio network controller by detecting the sub-flow indicator, and in accordance with the sub-flow indicator arranging for the data from each of the different data fields to be communicated via a different radio access bearer providing different quality of service parameters appropriate for the different data type.

9. A method as claimed in claim 8, wherein the forming the transport frame comprises generating a service data unit from the payload data and an internet protocol header from each data packet, and combining the service data unit with the sub-flow indicator.

10. A method as claimed in claim 9, wherein the communicating the data packets between the mobile communications user equipment and the radio network controller comprises removing the internet protocol header from the service data unit before communication, and adding the internet protocol header to the service data unit after communication of the payload data via each of the sub-flow radio access bearers.

11. A method as claimed in claim 9, wherein the forming the transport frame comprises compression encoding the internet header before combining with the payload data to form the service data unit.

12. A method as claimed in claim 11, comprising compression decoding the internet header when removed form the service data unit to reform the internet packets within the gateway support node.

13. A method as claimed in claim 8, wherein the payload data of the internet packet includes data frame formed from an adaptive multi-rate speech coded, the data frame providing the plurality of the different types of data.

14. A gateway support node for communicating internet data packets between user equipment and a packet data telecommunications network, the internet packet data carrying payload data which includes a plurality of different types of data, the gateway support node comprising a data packet processing layer, and a user data tunnelling layer operable to provide a virtual channel for communicating the processed data packets via an internet protocol communications layer, wherein the data packet processing layer is operable to parse the payload data in each data packet to determine a number of the plurality of different data types and the number of data symbols in each of the different data types, to generate a radio access bearer sub-flow indicator providing an indication of a number of different types of data in the payload and a number of symbols in each different data type, to form a transport frame for each data packet by combining the payload data for each data packet with the sub-flow indicator, the transport frame being used to communicate each processed data packet between the gateway support node and a radio network controller via a service support node using the user data tunnelling layer.

15. A gateway support node as claimed in claim 14, where the data packet processing layer is operable to form the transport frame by generating a service data unit from the payload data and an internet protocol header from each data packet, and combining the service data unit with the sub-flow indicator.

16. A gateway support node as claimed in claim 15, wherein the data packet processing layer is operable to compression encode the internet protocol header before the internet protocol header is combined with the payload data to form the service data unit.

17. A gateway support node as claimed in claim 16, wherein the data packet processing layer is operable to compression decode the internet protocol header when removed from the service data unit to reform the internet packets.

18. A gateway support node as claimed in claim 17, wherein the gateway support node is a gateway general packet radio system support node.

19. A mobile communications user equipment for receiving internet data packets from a gateway support node according to claim 14 via a radio network controller, the internet packet data carrying payload data which includes a plurality of different types of data, the mobile communications user equipment comprising a plurality of radio access bearers in combination with the radio network controller each radio access bearer providing quality of service parameters appropriate for receiving one of the different types of data of the internet protocol data packet, and a data packet processing layer operable to reform the internet protocol packet data by combining the different data types into a data frame determined from a number of data symbol received from each of the different radio access bearers.

20. A mobile communications user equipment as claimed in claim 19, comprising a packet data protocol layer operable to add an internet protocol header after communication of the payload data via each of the sub-flow radio access bearers.

21. A mobile communications user equipment for communicating internet data packets to a gateway support node according to claim 14 via a radio network controller, the internet packet data carrying payload data which include a plurality of different types of data, the mobile communications user equipment comprising an internet protocol packet processing layer operable to parse the payload data in each data packet to determine a number of the plurality of different data types and the number of data symbols in each of the different data types, to generate a radio access bearer sub-flow indicator providing an indication of a number of different types of data in the payload and a number of symbols in each different data type, and in accordance with the sub-flow indicator arranging for the data from each of the different data fields to be communicated via a different radio access bearer providing different quality of service parameters appropriate for the different data type.

22. A memory device storing a computer program having computer executable instructions, which is loaded on to a data processor and causes the data processor to perform a method for communicating internet packet data with a mobile communications user equipmemt, the internet packet data carrying payload data including a plurality of different data types, comprising:

providing an interface for communicating the data packets between the mobile communications user equipment and a packet data telecommunications network, communicating the data packets between the interface and the mobile communications user equipment using a radio network controller, the radio network controller being operable to provide radio access bearers for communicating the data packets to and/or from the mobile communications user equipment, wherein the communicating the data packets between the interface and the mobile communications user equipment comprises parsing the payload data in each data packet to determine a number of the plurality of different types of data and a number of data symbols in each of the different data types, generating a radio access bearer sub-flow indicator providing an indication of the number of different types of data in the payload and the number of symbols in each different data type, forming a transport frame for each data packet by combining the payload data for each data packet with the sub-flow indicator, the transport frame being used to communicate each data packet between the interface and the radio network controller, and communicating the data packets between the mobile communications user equipment and the radio network controller by detecting the sub-flow indicator, and in accordance with the sub-flow indicator arranging for the data from each of the different data fields to be communicated via a different radio access bearer providing different quality of service parameters appropriate for the different data type.

23. A telecommunications system as claimed in claim 3, wherein the internet header is compression encoded before being combined with the payload data to form the service data unit.

24. A telecommunications system as claimed in claim 23, wherein the compressed internet protocol header is decompressed when removed from the service data unit to reform the internet packets within the gateway support node.

25. A telecommunications system as claimed in claim 2, wherein the payload data of the internet packet includes a data frame formed from an adaptive multi-rate speech coded, the data frame providing the plurality of the different types of data.

26. A telecommunications system as claimed in claim 3, wherein the payload data of the internet packet includes a data frame formed from an adaptive multi-rate speech coded, the data frame providing the plurality of the different types of data.

27. A telecommunications system as claimed in claim 4, wherein the payload data of the internet packet includes a data frame formed from an adaptive multi-rate speech coded, the data frame providing the plurality of the different types of data.

28. A telecommunications system as claimed in claim 5, wherein the payload data of the internet packet includes a data frame formed from an adaptive multi-rate speech coded, the data frame providing the plurality of the different types of data.

29. A telecommunications system as claimed in claim 23, wherein the payload data of the internet packet includes a data frame formed from an adaptive multi-rate speech coded, the data frame providing the plurality of the different types of data.

30. A telecommunications system as claimed in claim 24, wherein the payload data of the internet packet includes a data frame formed from an adaptive multi-rate speech coded, the data frame providing the plurality of the different types of data.

31. A telecommunications system as claimed in claim 2, wherein the mobile radio telecommunications network is operable in accordance with the General Packet Radio System (GPRS), the gateway support node being a gateway GPRS support node, and the service support node being a service GPRS support node.

32. A telecommunications system as claimed in claim 3, wherein the mobile radio telecommunications network is operable in accordance with the General Packet Radio System (GPRS), the gateway support node being a gateway GPRS support node, and the service support node being a service GPRS support node.

33. A telecommunications system as claimed in claim 4, wherein the mobile radio telecommunications network is operable in accordance with the General Packet Radio System (GPRS), the gateway support node being a gateway GPRS support node, and the service support node being a service GPRS support node.

34. A telecommunications system as claimed in claim 5, wherein the mobile radio telecommunications network is operable in accordance with the General Packet Radio System (GPRS), the gateway support node being a gateway GPRS support node, and the service support node being a service GPRS support node.

35. A telecommunications system as claimed in claim 6, wherein the mobile radio telecommunications network is operable in accordance with the General Packet Radio System (GPRS), the gateway support node being a gateway GPRS support node, and the service support node being a service GPRS support node.

36. A method as claimed in claim 10, wherein the forming the transport frame comprises
compression encoding the internet header before combining with the payload data to form the service data unit.

37. A method as claimed in claim 36, comprising
compression decoding the internet header when removed form the service data unit to reform the internet packets within the gateway support node.

38. A method as claimed in claim 9, wherein the payload data of the internet packet includes a data frame formed from an adaptive multi-rate speech coded, the data frame providing the plurality of the different types of data.

39. A method as claimed in claim 10, wherein the payload data of the internet packet includes a data frame formed from an adaptive multi-rate speech coded, the data frame providing the plurality of the different types of data.

40. A method as claimed in claim 11, wherein the payload data of the internet packet includes a data frame formed from an adaptive multi-rate speech coded, the data frame providing the plurality of the different types of data.

41. A method as claimed in claim 12, wherein the payload data of the internet packet includes a data frame formed from an adaptive multi-rate speech coded, the data frame providing the plurality of the different types of data.

42. A mobile communications user equipment for receiving internet data packets from a gateway support node according to claim 15 via a radio network controller, the internet packet data carrying payload data which includes a plurality of different types of data, the mobile communications user equipment comprising
a plurality of radio access bearers in combination with the radio network controller each radio access bearer providing quality of service parameters appropriate for receiving one of the different types of data of the internet protocol data packet, and
a data packet processing layer operable to reform the internet protocol packet data by combining the different data types into a data frame determined from a number of data symbol received from each of the different radio access bearers.

43. A mobile communications user equipment for receiving internet data packets from a gateway support node according to claim 16 via a radio network controller, the internet packet data carrying payload data which includes a plurality of different types of data, the mobile communications user equipment comprising
a plurality of radio access bearers in combination with the radio network controller each radio access bearer providing quality of service parameters appropriate for receiving one of the different types of data of the internet protocol data packet, and
a data packet processing layer operable to reform the internet protocol packet data by combining the different data types into a data frame determined from a number of data symbol received from each of the different radio access bearers.

44. A mobile communications user equipment for receiving internet data packets from a gateway support node according to claim 17 via a radio network controller, the internet packet data carrying payload data which includes a plurality of different types of data, the mobile communications user equipment comprising
a plurality of radio access bearers in combination with the radio network controller each radio access bearer providing quality of service parameters appropriate for receiving one of the different types of data of the internet protocol data packet, and
a data packet processing layer operable to reform the internet protocol packet data by combining the different data types into a data frame determined from a number of data symbol received from each of the different radio access bearers.

45. A mobile communications user equipment for receiving internet data packets from a gateway support node according to claim 18 via a radio network controller, the internet packet data carrying payload data which includes a plurality of different types of data, the mobile communications user equipment comprising
a plurality of radio access bearers in combination with the radio network controller each radio access bearer providing quality of service parameters appropriate for receiving one of the different types of data of the internet protocol data packet, and
a data packet processing layer operable to reform the internet protocol packet data by combining the different data types into a data frame determined from a number of data symbol received from each of the different radio access bearers.

46. A mobile communications user equipment as claimed in claim 42, comprising a packet data protocol layer operable to add an internet protocol header after communication of the payload data via each of the sub-flow radio access bearers.

47. A mobile communications user equipment as claimed in claim 43, comprising a packet data protocol layer operable to add an internet protocol header after communication of the payload data via each of the sub-flow radio access bearers.

48. A mobile communications user equipment as claimed in claim 44, comprising a packet data protocol layer operable to add an internet protocol header after communication of the payload data via each of the sub-flow radio access bearers.

49. A mobile communications user equipment as claimed in claim 45, comprising a packet data protocol layer operable to add an internet protocol header after communication of the payload data via each of the sub-flow radio access bearers.

50. A mobile communications user equipment for communicating internet data packets to a gateway support node according to claim 15 via a radio network controller, the internet packet data carrying payload data which include a plurality of different types of data, the mobile communications user equipment comprising
an internet protocol packet processing layer operable
to parse the payload data in each data packet to determine a number of the plurality of different data types and the number of data symbols in each of the different data types,
to generate a radio access bearer sub-flow indicator providing an indication of a number of different types of data in the payload and a number of symbols in each different data type, and in accordance with the sub-flow indicator arranging for the data from each of the different data fields to be communicated via a different radio access bearer providing different quality of service parameters appropriate for the different data type.

51. A mobile communications user equipment for communicating internet data packets to a gateway support node according to claim 16 via a radio network controller, the internet packet data carrying payload data which include a plurality of different types of data, the mobile communications user equipment comprising an internet protocol packet processing layer operable to parse the payload data in each data packet to determine a number of the plurality of different data types and the number of data symbols in each of the different data types, to generate a radio access bearer sub-flow indicator providing an indication of a number of different types of data in the payload and a number of symbols in each different data type, and in accordance with the sub-flow indicator arranging for the data from each of the different data fields to be communicated via a different radio access bearer providing different quality of service parameters appropriate for the different data type.

52. A mobile communications user equipment for communicating internet data packets to a gateway support node according to claim 17 via a radio network controller, the internet packet data carrying payload data which include a plurality of different types of data, the mobile communications user equipment comprising an internet protocol packet processing layer operable to parse the payload data in each data packet to determine a number of the plurality of different data types and the number of data symbols in each of the different data types, to generate a radio access bearer sub-flow indicator providing an indication of a number of different types of data in the payload and a number of symbols in each different data type, and in accordance with the sub-flow indicator arranging for the data from each of the different data fields to be communicated via a different radio access bearer providing different quality of service parameters appropriate for the different data type.

53. A mobile communications user equipment for communicating internet data packets to a gateway support node according to claim 18 via a radio network controller, the internet packet data carrying payload data which include a plurality of different types of data, the mobile communications user equipment comprising an internet protocol packet processing layer operable to parse the payload data in each data packet to determine a number of the plurality of different data types and the number of data symbols in each of the different data types, to generate a radio access bearer sub-flow indicator providing an indication of a number of different types of data in the payload and a number of symbols in each different data type, and in accordance with the sub-flow indicator arranging for the data from each of the different data fields to be communicated via a different radio access bearer providing different quality of service parameters appropriate for the different data type.

54. A memory device storing a computer program having computer executable instructions, which is loaded on to a data processor and causes the data processor to perform a method for communicating internet packet data with a mobile communications user equipment, the internet packet data carrying payload data including a plurality of different data types, comprising:

providing an interface for communicating the data packets between the mobile communications user equipment and a packet data telecommunications network, communicating the data packets between the interface and the mobile communications user equipment using a radio network controller, the radio network controller being operable to provide radio access bearers for communicating the data packets to and/or from the mobile communications user equipment, wherein the communicating the data packets between the interface and the mobile communications user equipment comprises parsing the payload data in each data packet to determine a number of the plurality of different types of data and a number of data symbols in each of the different data types, generating a radio access bearer sub-flow indicator providing an indication of the number of different types of data in the payload and the number of symbols in each different data type, forming a transport frame for each data packet by combining the payload data for each data packet with the sub-flow indicator, the transport frame being used to communicate each data packet between the interface and the radio network controller, wherein the forming the transport frame comprises generating a service data unit from the payload data and an internet protocol header from each data packet, and combining the service data unit with the sub-flow indicator, and communicating the data packets between the mobile communications user equipment and the radio network controller by detecting the sub-flow indicator, and in accordance with the sub-flow indicator arranging for the data from each of the different data fields to be communicated via a different radio access bearer providing different quality of service parameters appropriate for the different data type.

55. A memory device storing a computer program having computer executable instructions, which is loaded on to a data processor and causes the data processor to perform a method for communicating internet packet data with a mobile communications user equipment, the internet packet data carrying payload data including a plurality of different data types, comprising:

providing an interface for communicating the data packets between the mobile communications user equipment and a packet data telecommunications network, communicating the data packets between the interface and the mobile communications user equipment using a radio network controller, the radio network controller being operable to provide radio access bearers for communicating the data packets to and/or from the mobile communications user equipment, wherein the communicating the data packets between the interface and the mobile communications user equipment comprises parsing the payload data in each data packet to determine a number of the plurality of different types of data and a number of data symbols in each of the different data types, wherein the payload data of the internet packet comprises a data frame formed from an adaptive multi-rate speech coded, the data frame providing the plurality of the different types of data, generating a radio access bearer sub-flow indicator providing an indication of the number of different types of data in the payload and the number of symbols in each different data type, forming a transport frame for each data packet by combining the payload data for each data packet with the sub-flow indicator, the transport frame being used to communicate each data packet between the interface and the radio network controller, and communicating the data packets between the mobile communications user equipment and the radio network controller by detecting the sub-flow indicator, and in accordance with the sub-flow indicator arranging for the data from each of the different data fields to be communicated via a different radio access bearer providing different quality of service parameters appropriate for the different data type.

* * * * *

UNITED STATES PATENT AND TRADEMARK OFFICE
CERTIFICATE OF CORRECTION

PATENT NO. : 7,688,859 B2  Page 1 of 1
APPLICATION NO. : 10/550008
DATED : March 30, 2010
INVENTOR(S) : Xiaobao Chen, Alan George Stidwell and Martin Barkley Harris It is certified that error appears in the above-identified patent and that said Letters Patent is hereby corrected as shown below:

IN THE REFERENCES CITED [56]

At the title page, references cited (56), please add the reference: 6,389,356 to Onishi.

Signed and Sealed this

Eleventh Day of May, 2010

David J. Kappos
*Director of the United States Patent and Trademark Office*